(12) United States Patent
Zimmel

(10) Patent No.: US 8,542,972 B2
(45) Date of Patent: *Sep. 24, 2013

(54) WAVELENGTH DIVISION MULTIPLEXING MODULE

(75) Inventor: Steven C. Zimmel, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 88 days.

This patent is subject to a terminal disclaimer.

(21) Appl. No.: 13/049,176

(22) Filed: Mar. 16, 2011

(65) Prior Publication Data

US 2011/0222830 A1 Sep. 15, 2011

Related U.S. Application Data

(63) Continuation of application No. 12/467,564, filed on May 18, 2009, now Pat. No. 7,912,336, which is a continuation of application No. 11/975,905, filed on Oct. 22, 2007, now Pat. No. 7,536,075.

(51) Int. Cl.
*G02B 6/00* (2006.01)

(52) U.S. Cl.
USPC ............ 385/135; 385/134; 385/136; 385/137

(58) Field of Classification Search
USPC .................................. 385/134, 135, 136, 137
See application file for complete search history.

(56) References Cited

U.S. PATENT DOCUMENTS

| | | |
|---|---|---|
| 4,435,612 A | 3/1984 | Smith |
| 5,189,410 A | 2/1993 | Kosugi et al. |
| 5,317,663 A | 5/1994 | Beard et al. |
| 5,339,379 A | 8/1994 | Kutsch et al. |
| 5,363,465 A | 11/1994 | Korkowski et al. |
| 5,432,875 A | 7/1995 | Korkowski et al. |
| 5,497,444 A | 3/1996 | Wheeler |
| 5,627,925 A | 5/1997 | Alferness et al. |
| 5,694,511 A | 12/1997 | Pimpinella et al. |
| 5,701,380 A | 12/1997 | Larson et al. |
| 5,717,810 A | 2/1998 | Wheeler |
| 5,946,440 A | 8/1999 | Puetz |

(Continued)

FOREIGN PATENT DOCUMENTS

| | | |
|---|---|---|
| DE | 202 01 170 U1 | 5/2002 |
| EP | 0 202 994 A1 | 11/1986 |

(Continued)

OTHER PUBLICATIONS

ADC Telecommunications, Inc., DSX-3 Digital Signal Cross-Connect, Doc. No. 274, dated Oct. 2004, 65 pp.

(Continued)

*Primary Examiner* — Jennifer Doan
(74) *Attorney, Agent, or Firm* — Merchant & Gould PC

(57) ABSTRACT

A telecommunications assembly includes a chassis and a plurality of optical wavelength division multiplexer/demultiplexer modules mounted within the chassis. Each module includes at least one fiber optic connector. Within an interior of the chassis are positioned at least one fiber optic adapter. Inserting the modules through an opening of the chassis at a mounting location positions the connector of the module for insertion into and mating with the adapter of the chassis. A method of mounting an optical wavelength division multiplexer/demultiplexer module within a telecommunications chassis is also disclosed.

15 Claims, 32 Drawing Sheets

(56) References Cited

U.S. PATENT DOCUMENTS

| | | |
|---|---|---|
| 6,208,796 B1 | 3/2001 | Vigliaturo |
| 6,226,111 B1 | 5/2001 | Chang et al. |
| 6,263,136 B1 | 7/2001 | Jennings et al. |
| 6,307,998 B2 | 10/2001 | Vigliaturo |
| 6,363,183 B1 | 3/2002 | Koh |
| 6,370,294 B1 | 4/2002 | Pfeiffer et al. |
| 6,418,262 B1 | 7/2002 | Puetz et al. |
| 6,424,781 B1 | 7/2002 | Puetz et al. |
| 6,532,332 B2 | 3/2003 | Solheid et al. |
| 6,535,682 B1 | 3/2003 | Puetz et al. |
| 6,556,738 B2 | 4/2003 | Pfeiffer et al. |
| 6,556,763 B1 | 4/2003 | Puetz et al. |
| 6,591,051 B2 | 7/2003 | Solheid et al. |
| 6,614,953 B2 | 9/2003 | Strasser et al. |
| RE38,311 E | 11/2003 | Wheeler |
| 6,647,197 B1 | 11/2003 | Marrs et al. |
| 6,668,108 B1 | 12/2003 | Helkey et al. |
| 6,760,531 B1 | 7/2004 | Solheid et al. |
| 6,810,193 B1 | 10/2004 | Müller |
| 6,822,874 B1 | 11/2004 | Marler |
| 6,850,685 B2 | 2/2005 | Tinucci et al. |
| 6,885,798 B2 | 4/2005 | Zimmel |
| 7,142,764 B2 | 11/2006 | Allen et al. |
| 7,190,874 B1 | 3/2007 | Barth et al. |
| 7,194,181 B2 | 3/2007 | Holmberg et al. |
| 7,346,254 B2 | 3/2008 | Kramer et al. |
| 7,376,322 B2 | 5/2008 | Zimmel et al. |
| 7,376,323 B2 | 5/2008 | Zimmel |
| 7,400,813 B2 | 7/2008 | Zimmel |
| 7,536,075 B2 | 5/2009 | Zimmel |
| 7,912,336 B2 * | 3/2011 | Zimmel .................... 385/135 |
| 2002/0181896 A1 | 12/2002 | McClellan et al. |
| 2003/0132685 A1 | 7/2003 | Sucharczuk et al. |
| 2003/0134541 A1 | 7/2003 | Johnsen et al. |
| 2003/0147597 A1 | 8/2003 | Duran |
| 2003/0202765 A1 | 10/2003 | Franklin et al. |
| 2004/0240826 A1 | 12/2004 | Daoud et al. |
| 2005/0053341 A1 | 3/2005 | Zimmel |
| 2005/0067847 A1 | 3/2005 | Zellak |
| 2005/0105879 A1 | 5/2005 | Kanasaki et al. |
| 2005/0167147 A1 | 8/2005 | Marsac et al. |
| 2005/0232550 A1 | 10/2005 | Nakajima et al. |
| 2005/0232551 A1 | 10/2005 | Chang et al. |
| 2005/0232565 A1 | 10/2005 | Heggestad et al. |
| 2006/0083468 A1 | 4/2006 | Kahle et al. |
| 2007/0036503 A1 | 2/2007 | Solheid et al. |
| 2007/0147765 A1 | 6/2007 | Gniadek et al. |
| 2007/0189692 A1 | 8/2007 | Zimmel et al. |

FOREIGN PATENT DOCUMENTS

| | | |
|---|---|---|
| EP | 0 730 177 A2 | 9/1996 |
| EP | 0 828 356 A2 | 3/1998 |
| EP | 1 473 578 A2 | 11/2004 |
| EP | 1 589 361 A1 | 10/2005 |
| GB | 2 300 978 A | 11/1996 |
| WO | WO 96/36896 | 11/1996 |
| WO | WO 02/39170 A2 | 5/2002 |
| WO | WO 03/093889 A1 | 11/2003 |
| WO | WO 2006/127397 A1 | 11/2006 |

OTHER PUBLICATIONS

ADC Telecommunications, Inc., OmniReach FTTP Solutions, Doc. No. 1276550, dated May 2004, 12 pp.

Prosecution History of U.S. Appl. No. 10/980,978 (OA Dec. 15, 2005; Resp. Jun. 15, 2006; OA Sep. 6, 2006; Resp. Mar. 6, 2007; OA Jun. 1, 2007; Resp. Nov. 16, 2007; Notice of Allowance Apr. 2, 2008; Issue Fee Payment and 312 Amendment Apr. 1, 2008; Response to 312 Communication Apr. 18, 2008).

Prosecution History of U.S. Appl. No. 11/138,063 (OA Dec. 27, 2006; Resp. Apr. 27, 2007; OA Jul. 30, 2007; Resp/RCE Nov. 16, 2007; Notice of Allowance Dec. 13, 2007; Issue Fee Payment and 312 Amendment Mar. 13, 2008; Examiner's Amendment Mar. 14, 2008; Examiner's Amendment Mar. 24, 2008; Communication/312 Amendment Considered May 27, 2008).

Prosecution History of U.S. Appl. No. 11/138,889 (OA Dec. 14, 2005; Resp. Jun. 14, 2006; OA Sep. 11, 2006; Resp. Mar. 12, 2007; OA Jun. 13, 2007; Resp. Nov. 16, 2007; Notice of Allowance Apr. 18, 2008; Issue Fee Payment Apr. 17, 2008; Certificate of Correction Request Sep. 9, 2008).

Prosecution History of U.S. Appl. No. 11/215,837 (OA Jul. 28, 2006; Resp. Oct. 30, 2006; OA Jan. 26, 2007; Resp. Apr. 26, 2007; Notice of Allowance Aug. 2, 2007; Issue Fee Payment Jan. 18, 2008).

Prosecution History of U.S. Appl. No. 11/354,297 (OA Jun. 25, 2007; Resp. Nov. 16, 2007; Notice of Allowance Dec. 14, 2007; RCE w/IDS Mar. 14, 2008; Notice of Allowance Apr. 22, 2008; Issue Fee Payment Jul. 22, 2008).

Invitation to Pay Additional Fees with Partial International Search mailed Feb. 20, 2009.

International Search Report and Written Opinion mailed Apr. 22, 2009.

* cited by examiner

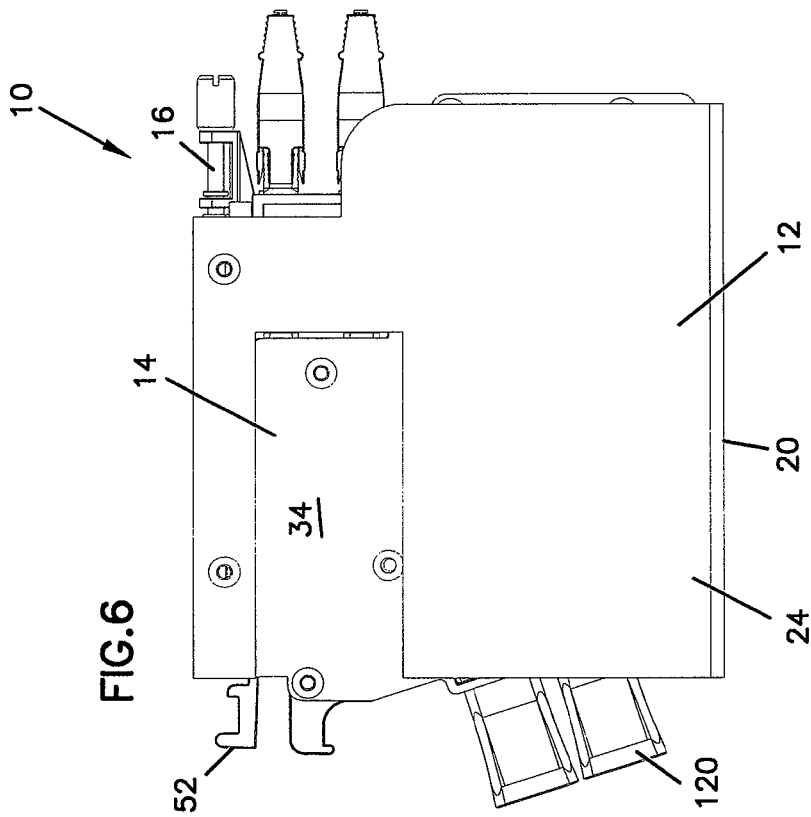
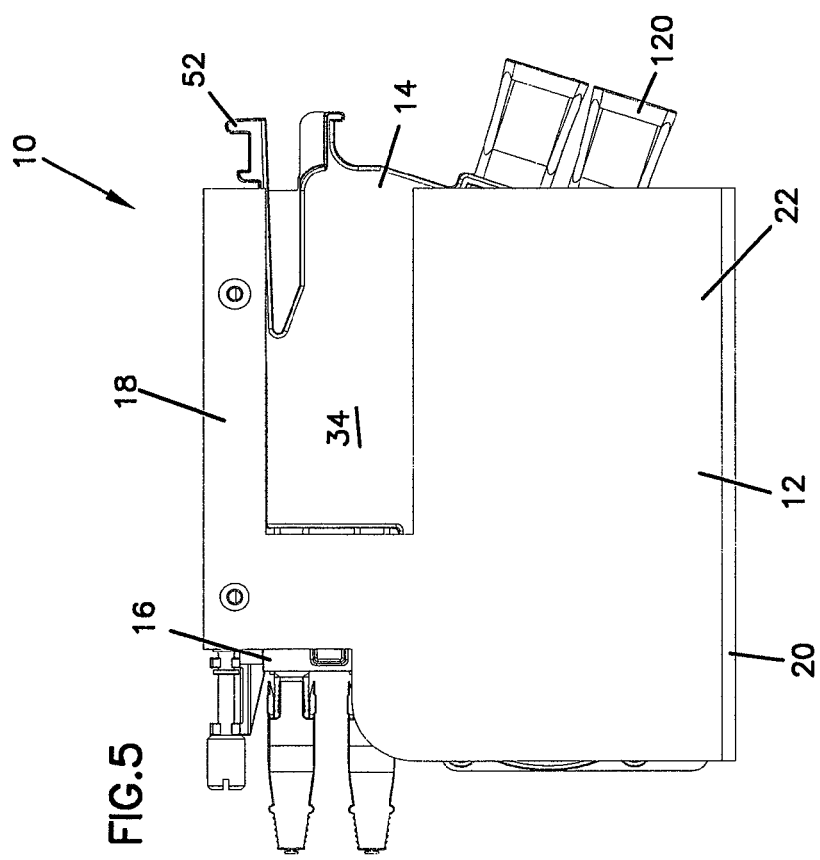

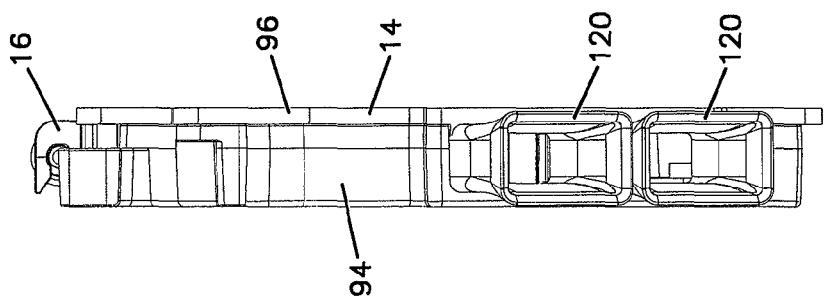
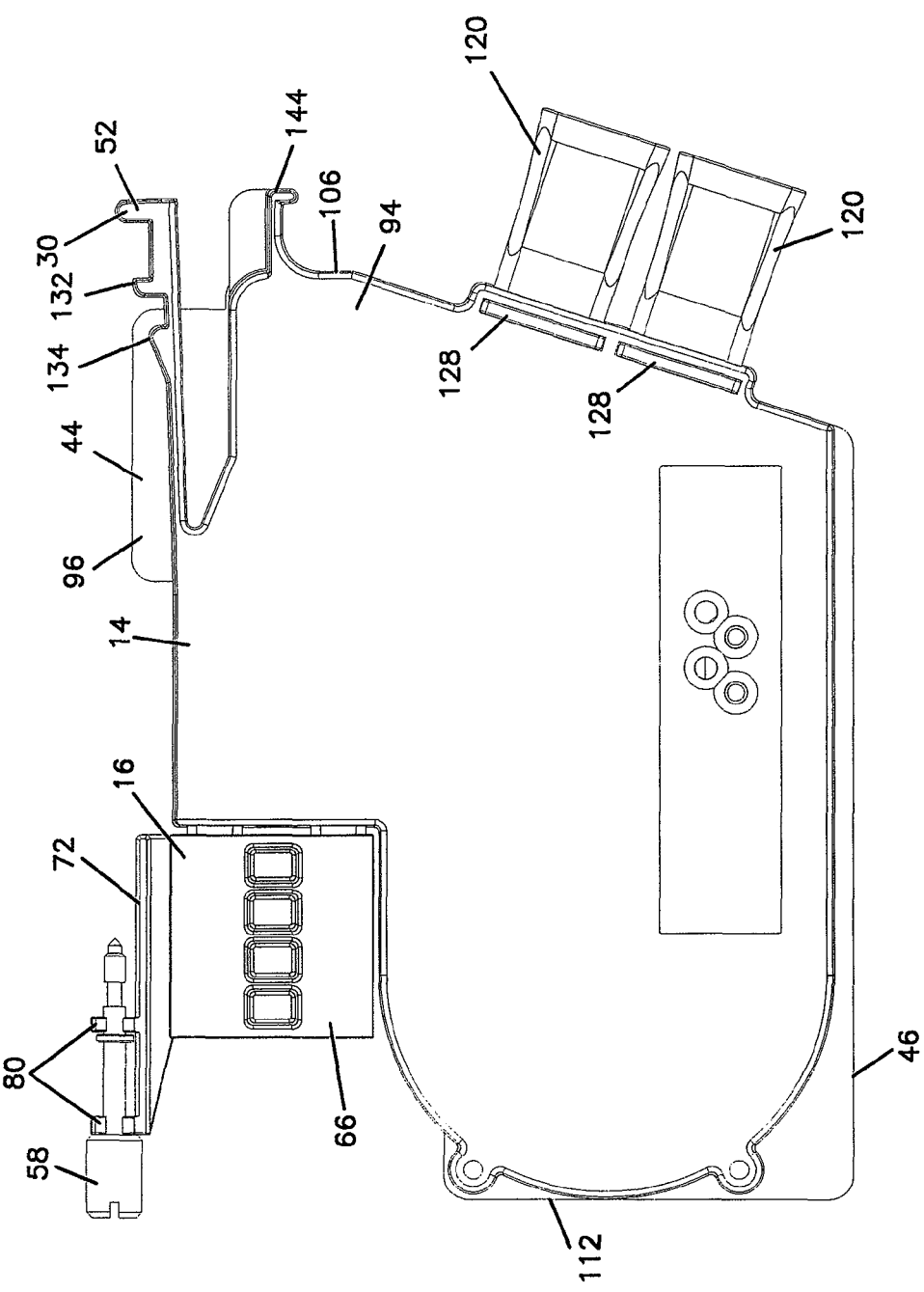

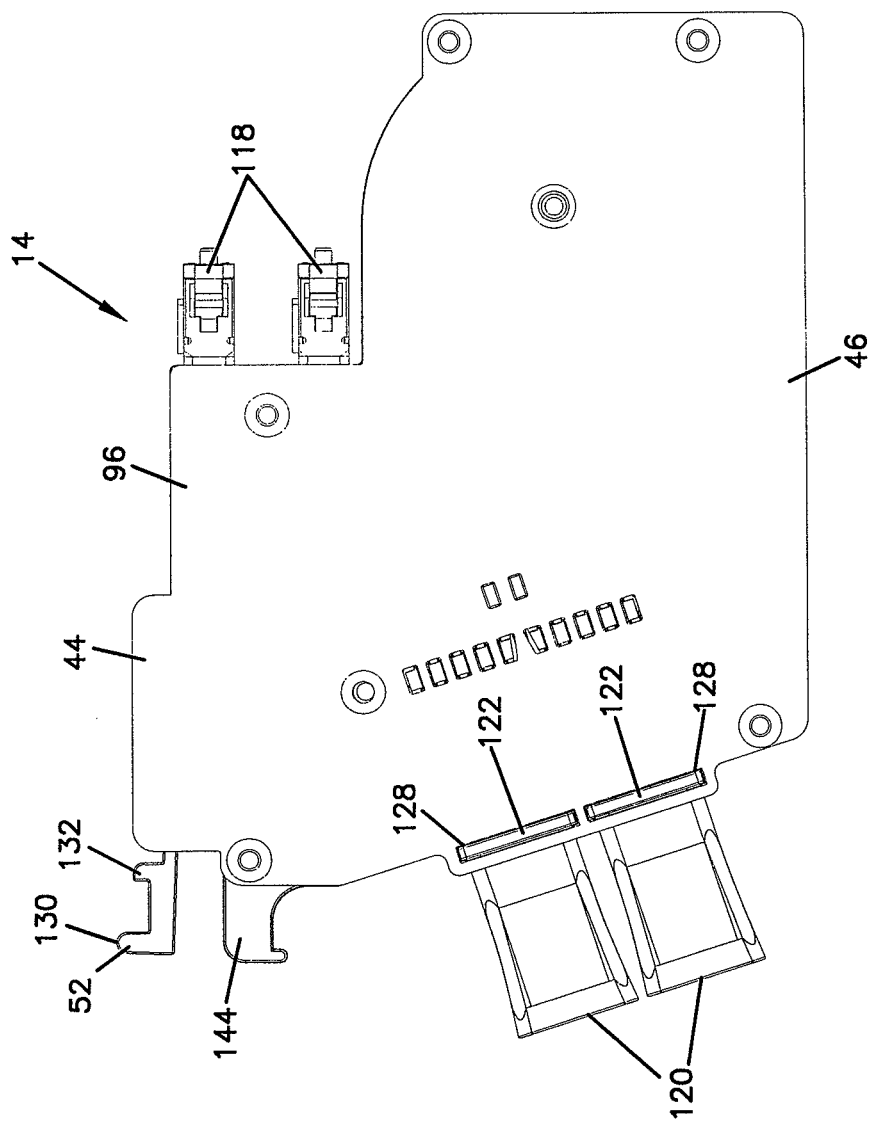

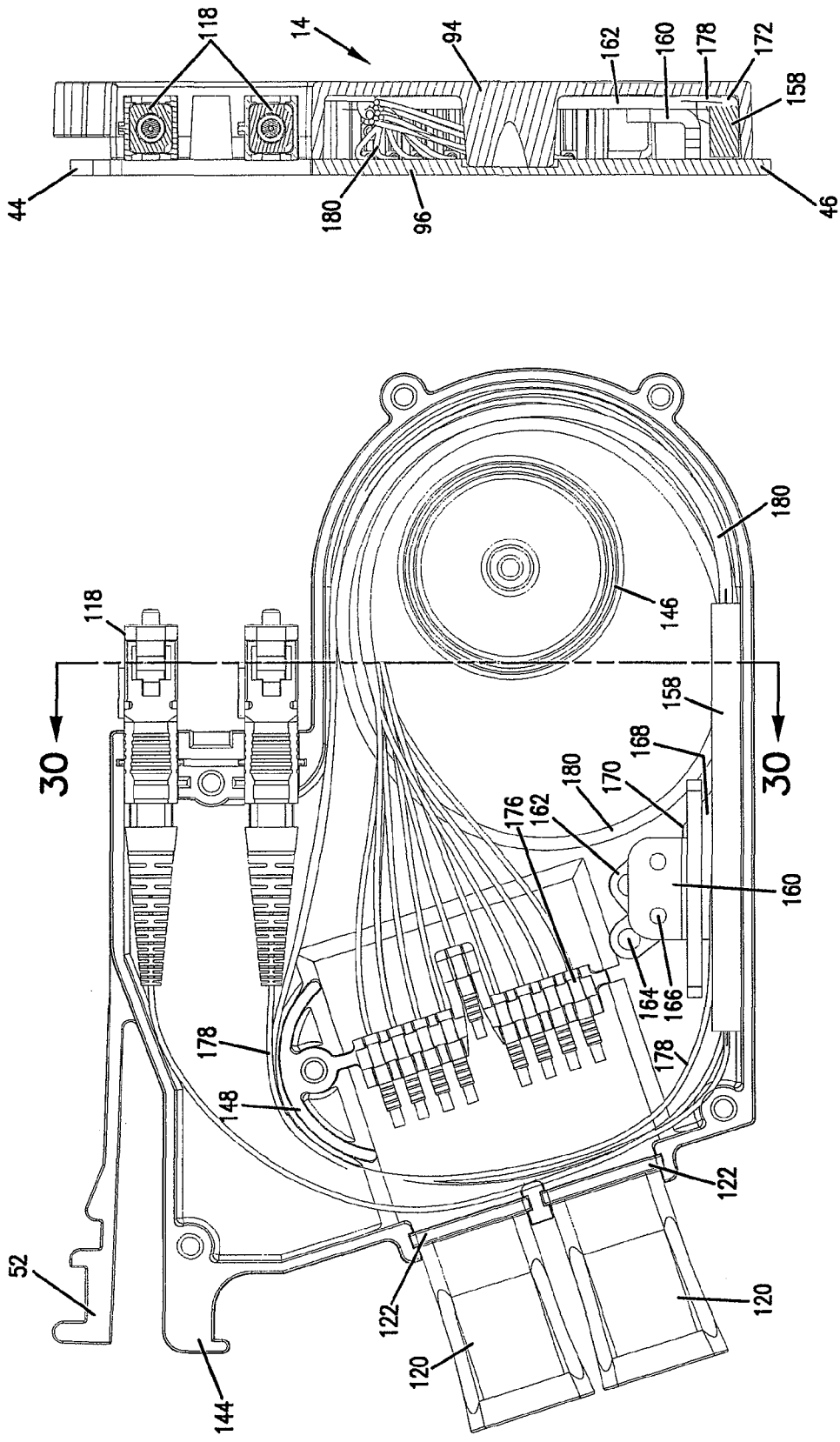

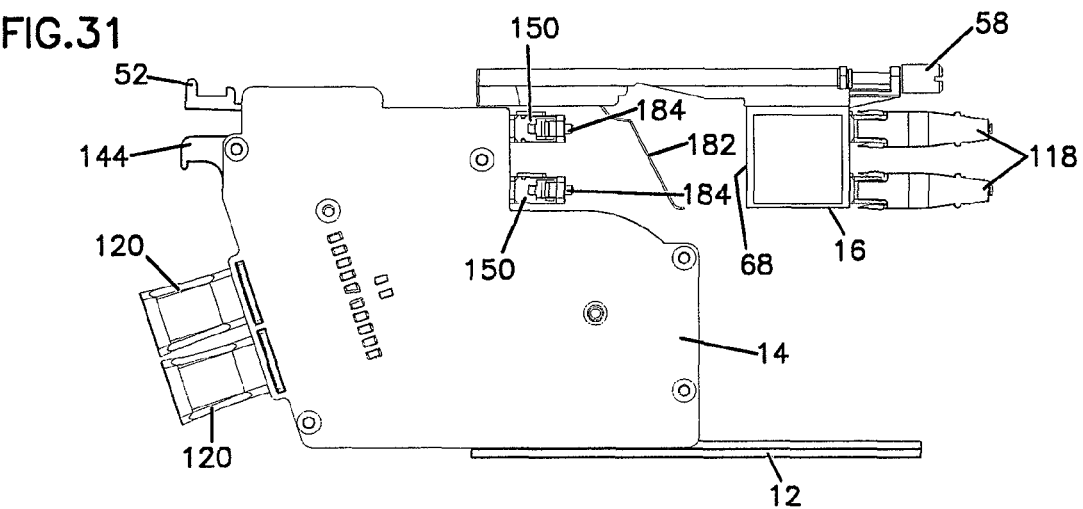
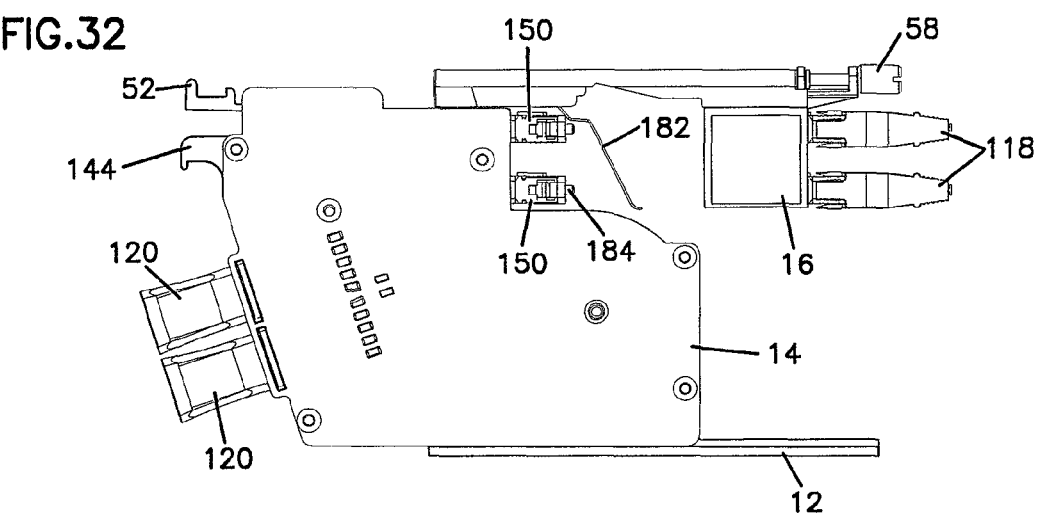
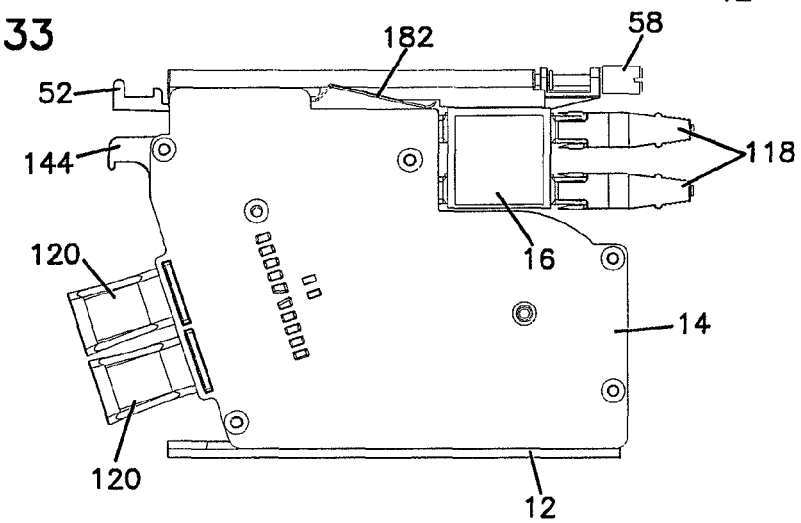

WAVELENGTH DIVISION MULTIPLEXING MODULE

CROSS REFERENCE TO RELATED APPLICATIONS

This application is a continuation of application Ser. No. 12/467,564, filed May 18, 2009, which is a continuation of application Ser. No. 11/975,905, filed Oct. 22, 2007, now U.S. Pat. No. 7,536,075, issued May 19, 2009, which applications are incorporated herein by reference in their entirety.

FIELD

The present disclosure generally relates to fiber optic telecommunications equipment. More specifically, the present disclosure relates to fiber optic modules and chassis for holding fiber optic modules.

BACKGROUND

In fiber optic telecommunications systems, it is common for optical fibers of transmission cables to be split into multiple strands, either by optical splitting of a signal carried by a single stranded cable or by fanning out the individual fibers of a multi-strand cable. Further, when such systems are installed, it is known to provide excess capacity in the installations to support future growth and utilization of the fibers. Often in these installations, modules including splitters or fanouts are used to provide the connection between transmission fibers and customer fibers. To reduce the cost and complexity of the initial installation and still provide options for future expansion, a module mounting chassis capable of mounting multiple modules may be used in such an installation.

While the chassis may accept several modules, the initial installation may only include fewer modules mounted in the chassis, or enough to serve current needs. These chassis may be configured with limited access to one or more sides, or may be mounted in cramped locations. In addition, some of these chassis may be pre-configured with the maximum capacity of transmission cables to accommodate and link to modules which may be installed in the future. Since it is desirable to have access to components within the chassis for cleaning during the installation of a new module, some provision or feature of the chassis will desirably permit a user to access and clean the connectors of these pre-connectorized and pre-installed transmission cables.

It is also desirable for the chassis to be configured to ensure that modules are installed correctly and aligned with other components within the chassis to mate with the pre-connectorized and pre-installed transmission cables.

In fiber-optic communications, it is also common for optical signals of transmission cables to be multiplexed. Wavelength division multiplexing (WDM) is a technology which multiplexes multiple optical carrier signals on a single optical fiber by using different wavelengths of laser light to carry different signals. This allows for a multiplication in capacity, in addition to making it possible to perform bidirectional communications over one strand of fiber.

A WDM system uses a multiplexer at the transmitter to join signals together and a demultiplexer at the receiver to split them apart. With the right type of fiber, it is possible to have a device that does both simultaneously, and can function as an optical add-drop multiplexer. WDM systems allow expansion of the capacity of the network without laying more fiber.

WDM systems are divided in different wavelength patterns: 1) conventional WDM; 2) dense WDM (DWDM); and 3) coarse WDM (CWDM). Conventional WDM systems may provide up to 16 channels in the 3rd transmission window (C-band) of silica fibers around 1550 nm with a channel spacing of 100 GHz. DWDM may use the same transmission window but with less channel spacing enabling up to 31 channels with 50 GHz spacing and 62 channels with 25 GHz spacing, sometimes called ultra dense WDM. CWDM in contrast to conventional WDM and DWDM uses increased channel spacing to allow less sophisticated and thus less expensive transceiver designs. WDM, DWDM and CWDM are based on the same concept of using multiple wavelengths of light on a single fiber, but differ in the spacing of the wavelengths, number of channels, and the ability to amplify the multiplexed signals in the optical space.

In the telecommunications industry, it would be desirable to package optical add-drop multiplexers in a modular form to allow for future expansion of service to customers. It would also be desirable to reduce the cost and complexity of the installation and integration of the multiplexers into telecommunications systems and allow for easy access to the multiplexers.

SUMMARY

The present invention relates to a telecommunications assembly including a chassis and a plurality of modules mounted within the chassis. The modules include one or more fiber optic connectors for receiving an input signal (or outputting an output signal). Within an interior of the module is located an optical multiplexer/demultiplexer. As a receiver, the multiplexer/demultiplexer is configured to demultiplex multiple optical carrier signals carried by the single input optical fiber into different wavelengths of laserlight as customer output signals. As a transmitter, the multiplexer/demultiplexer is configured to multiplex the customer signals, which are different wavelengths of laserlight, and combine them into a single optical fiber to be outputted at the one or more fiber optic connectors of the module.

Within the interior of the chassis, at each mounting location are positioned corresponding fiber optic adapters. Inserting the multiplexer module into the chassis at a mounting location positions the one or more connectors of the module for insertion into and mating with the adapters of the chassis.

The present invention further relates to a method of mounting a multiplexer module within a telecommunications chassis.

BRIEF DESCRIPTION OF THE DRAWINGS

The accompanying drawings, which are incorporated in and constitute a part of the description, illustrate several aspects of the inventive features and together with the detailed description, serve to explain the principles of the disclosure. A brief description of the drawings is as follows:

FIG. 5 is a left side view of the telecommunications assembly of FIG. 1;

FIG. 6 is a right side view of the telecommunications assembly of FIG. 1;

FIG. 17 is a left side view of the fiber optic splitter module and adapter assembly of FIG. 16;

FIG. 18 is a front view of the fiber optic splitter module and adapter assembly of FIG. 16;

FIG. 24 is a right side view of the fiber optic splitter module of FIG. 20;

FIG. 25 is a front view of the fiber optic splitter module of FIG. 20;

FIG. 29 is a right side view of the fiber optic splitter module of FIG. 20, shown without a cover exposing the interior features of the fiber optic splitter module including routing of a fiber optic cable within the fiber optic splitter module;

FIG. 30 is a cross-sectional view taken along section line 30-30 of FIG. 29;

FIG. 31 illustrates a fiber optic splitter module partially inserted within the chassis of FIG. 1, the chassis including an adapter assembly mounted thereon, the fiber optic splitter module shown in a position prior to the connectors of the splitter module having contacted a shield located within the chassis;

FIG. 32 illustrates the fiber optic splitter module of FIG. 31, shown in a position within the chassis with the connectors of the fiber optic splitter module making initial contact with the shield located within the chassis;

FIG. 33 illustrates the fiber optic splitter module of FIG. 31, shown in a fully inserted position within the chassis;

DETAILED DESCRIPTION

Figure 1:
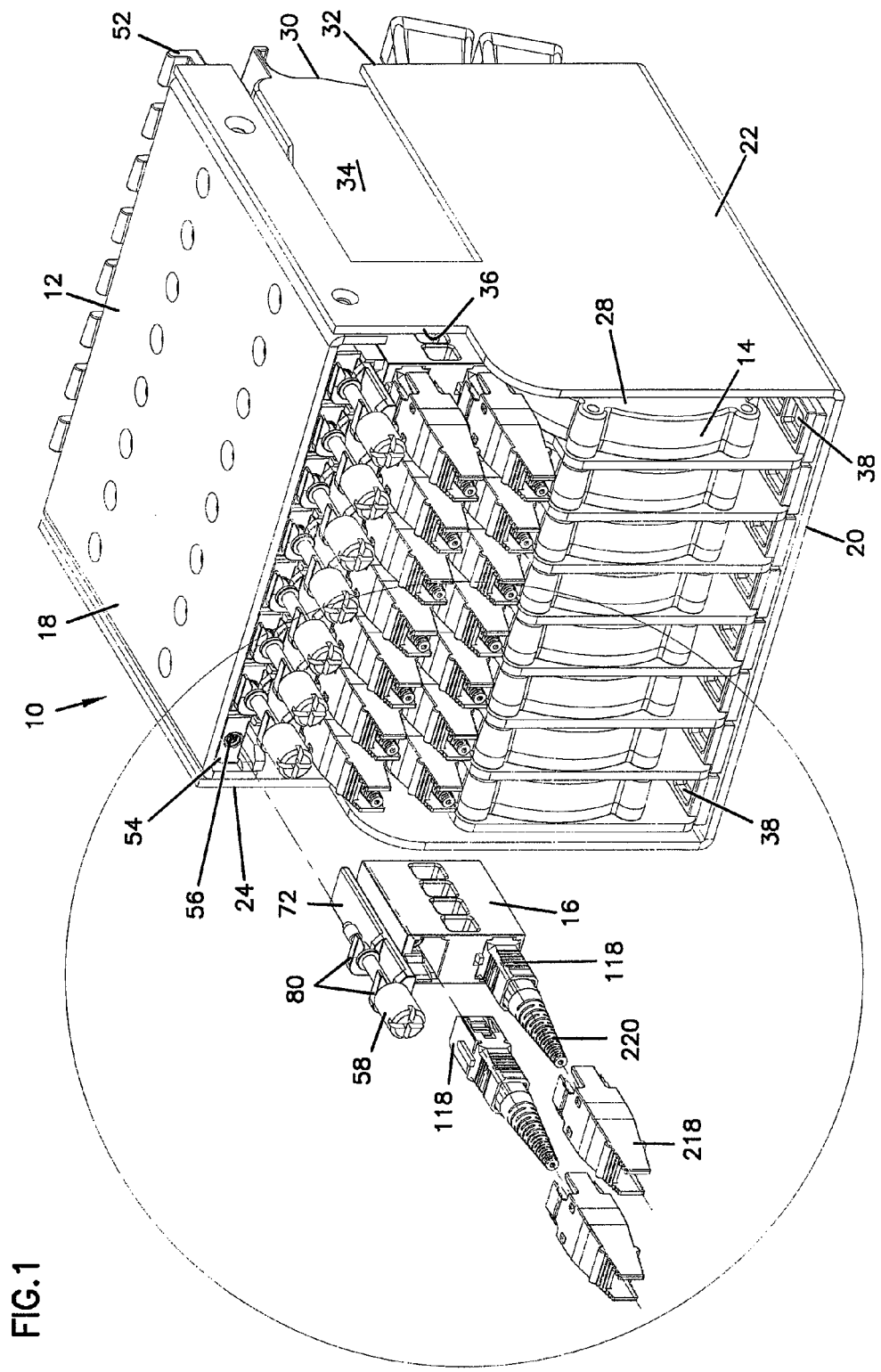
FIG. 1 is a rear perspective view of a telecommunications assembly with a plurality of fiber optic splitter modules installed within a chassis, with one of the adapter assemblies exploded out of the telecommunications assembly.
Figure 2:
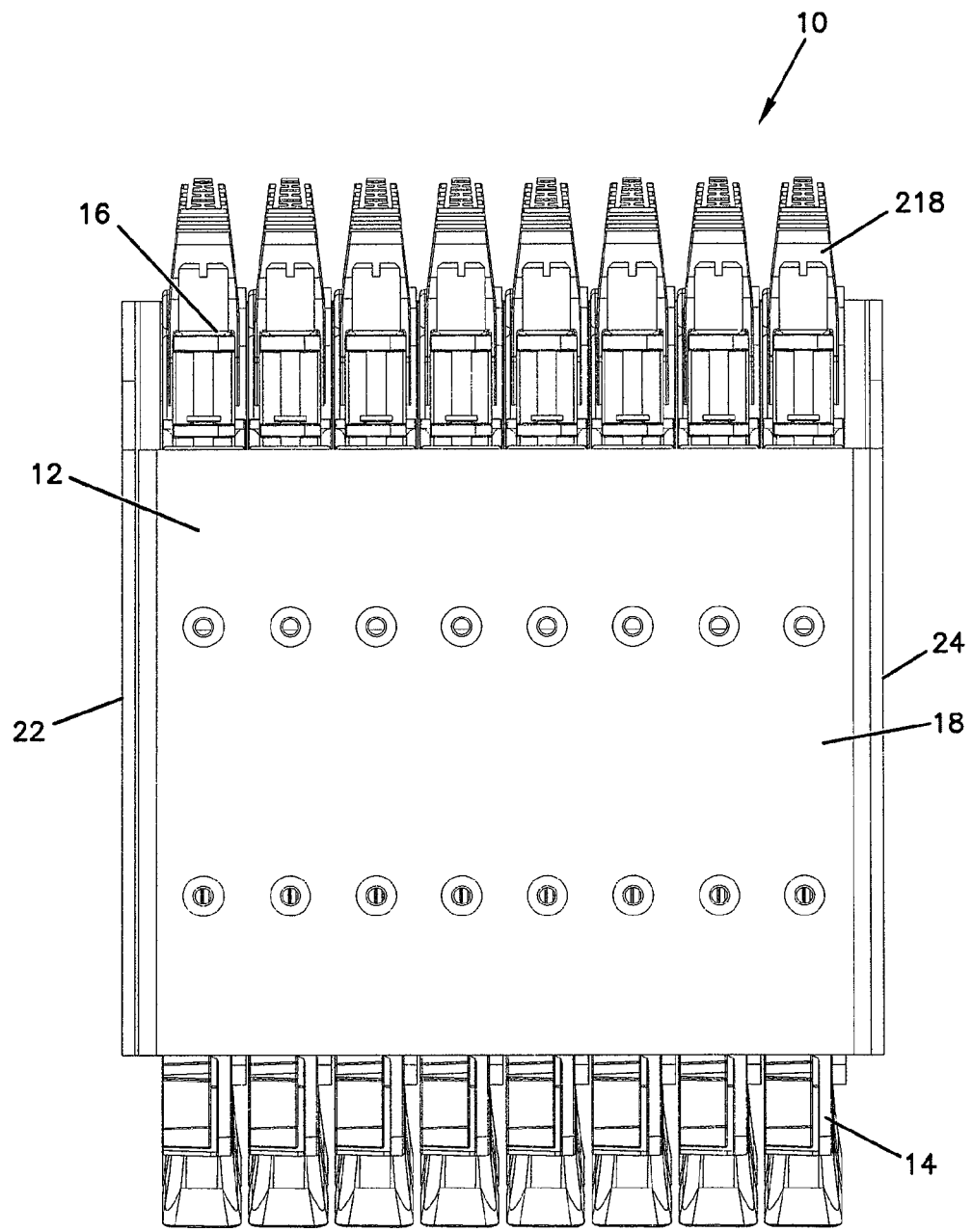
FIG. 2 is a top view of the telecommunications assembly of FIG. 1.
Figure 4:
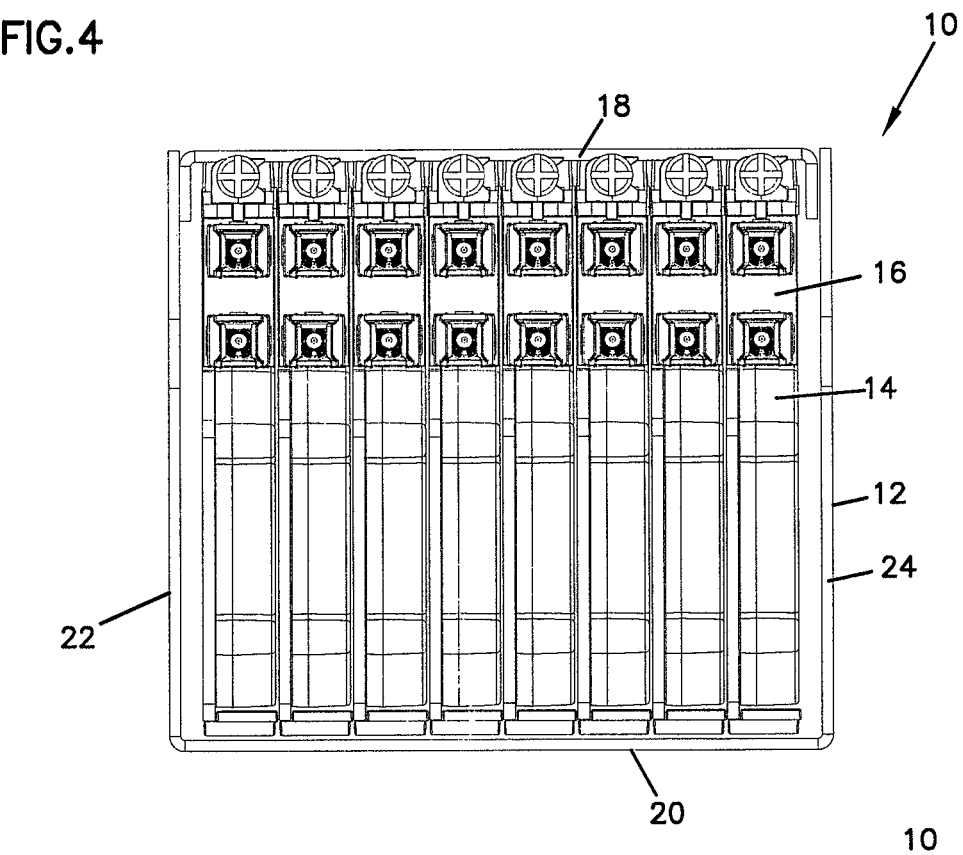
FIG. 4 is a rear view of the telecommunications assembly of FIG. 1.
Figure 3:
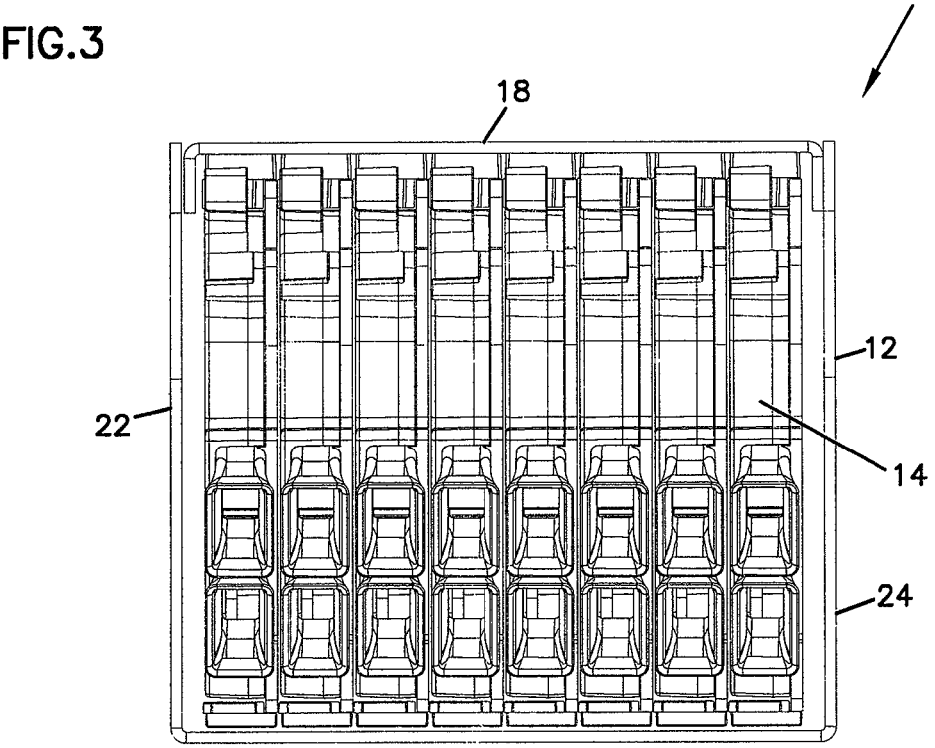
FIG. 3 is a front view of the telecommunications assembly of FIG. 1.

Reference will now be made in detail to exemplary aspects of the present invention which are illustrated in the accompanying drawings. Wherever possible, the same reference numbers will be used throughout the drawings to refer to the same or similar parts.

FIGS. 1-7 illustrate a telecommunications assembly 10 that includes a telecommunications chassis 12 and a plurality of fiber optic splitter modules 14 adapted to be mounted within chassis 12. Fiber optic splitter modules 14 are configured to be slidably inserted within chassis 12 and be optically coupled to adapter assemblies 16 mounted within chassis 12. Adapter assemblies 16 mounted within chassis 12 form connection locations between connectors terminated to an incoming fiber optic cable and connectors of splitter modules 14 as will be discussed in further detail below.

Still referring to FIGS. 1-7, chassis 12 includes a top wall 18 and a bottom wall 20 extending between a pair of opposing transverse sidewalls, 22, 24. Chassis 12 includes an opening 26 through a rear side 28 of chassis 12 and an opening 30 through a front side 32 of chassis 12. Fiber optic splitter modules 14 are inserted into chassis 12 through front opening 30. Adapter assemblies 16 are inserted through and mounted adjacent rear opening 26 of chassis 12. Sidewalls 22, 24, each include a cut-out 34 extending from front opening 30 toward rear side 28. Splitter modules 14 mounted within chassis 12 are visible through cut-out 34. Sidewalls 22, 24 of chassis 12 also define an inset portion 36 at rear side 28 of chassis 12 to facilitate access to adapter assemblies 16.

In FIG. 1, chassis 12 is shown with eight fiber optic splitter modules 14 mounted thereon. It should be noted that in other embodiments, the chassis may be sized to hold a larger or a smaller number of splitter modules. As will be described further below, it should be noted that the chassis may hold modules other than splitter modules, such as modules housing fiber optic multiplexers. A fiber optic splitter is only one example of telecommunications equipment that might be supported by the module.

Still referring to FIGS. 1-7, chassis 12 includes a plurality of mounting locations 38 for slidably receiving splitter modules 14. Each mounting location 38 defines a slot 40 adjacent top wall 18 and a slot 42 adjacent bottom wall 20 of chassis 12. Slots 42 adjacent bottom wall 20 are visible in FIG. 1. Slots 40 adjacent top wall 18 are illustrated in FIG. 6A. Slots 40, 42 extend from front 32 of chassis 12 to rear 28 of chassis 12. Slots 40, 42 are configured to receive mounting flanges 44, 46 of splitter modules 14 as shown in FIG. 6A to align modules 14 with other components within chassis 12 (e.g., adapters of the adapter assemblies) to mate with pre-connectorized and/or pre-installed transmission cables.

Slots 40 defined underneath top wall 18 of chassis 12 are deeper than slots 42 defined at bottom wall 20 of chassis 12. The depth of slots 40, 42 are configured to accommodate the different sized flanges 44, 46 that are defined at top and bottom walls of splitter modules 14. In this manner, slots 40, 42 and mounting flanges 44, 46 of fiber optic splitter modules 14 provide a keying system to ensure that modules 14 are inserted into chassis 12 in the correct orientation.

Figure 6A:
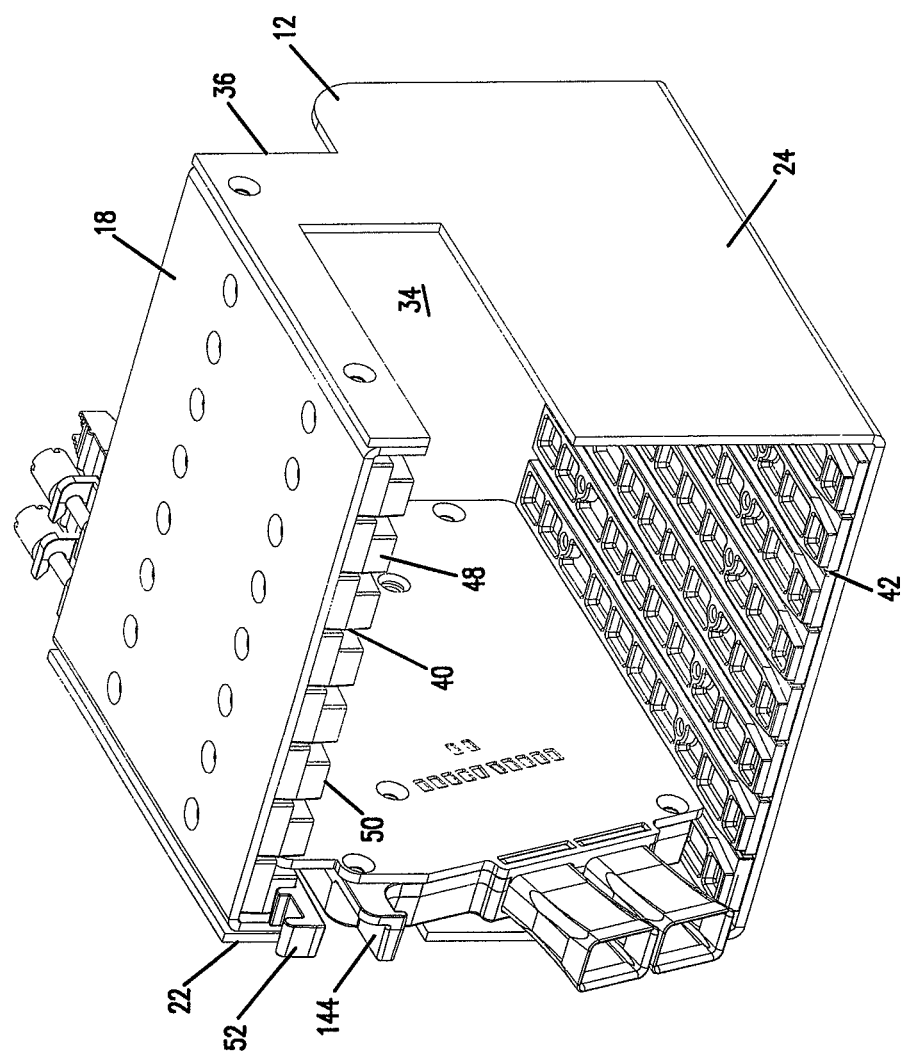
FIG. 6A illustrates a front perspective of the chassis of the telecommunications assembly of FIG. 1, shown with one fiber optic splitter module mounted therein.

Slots 40 underneath top wall 18 of chassis 12 are defined between a plurality of bulkheads 48 (please see FIG. 6A). Bulkheads 48 extend from front 32 of chassis 12 to rear 28 of chassis 12. At front end 32 of chassis 12, each bulkhead 48 defines a downwardly extending front lip 50 (FIG. 35) which interlocks with a resiliently deformable latch 52 (e.g., cantilever arm) of splitter module 14 to hold splitter module 14 in place within chassis 12, as will be discussed in further detail below.

Figure 7:
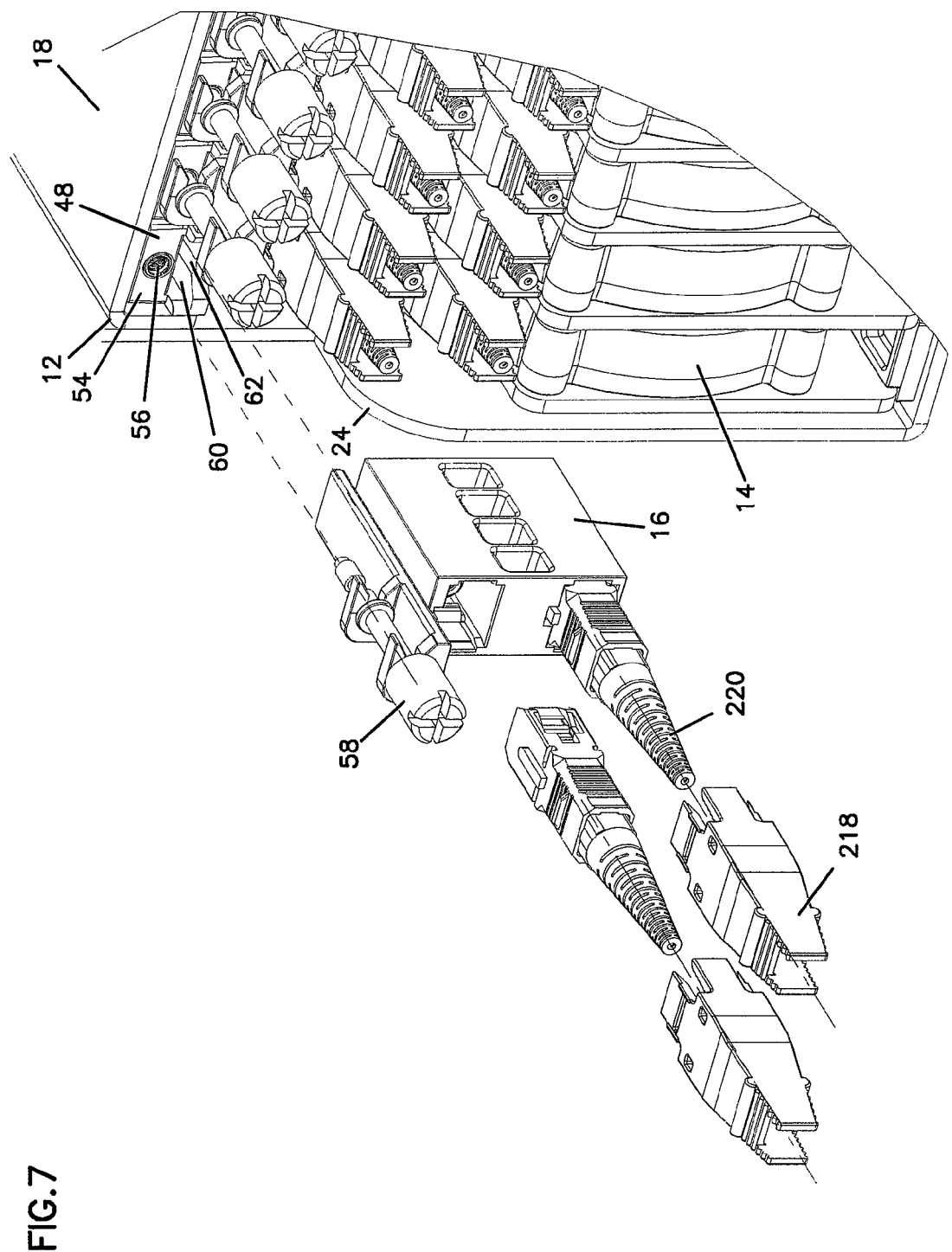
FIG. 7 is a close-up view of the telecommunications assembly of FIG. 1 showing the adapter assembly exploded out of the telecommunications assembly.
Figure 8:
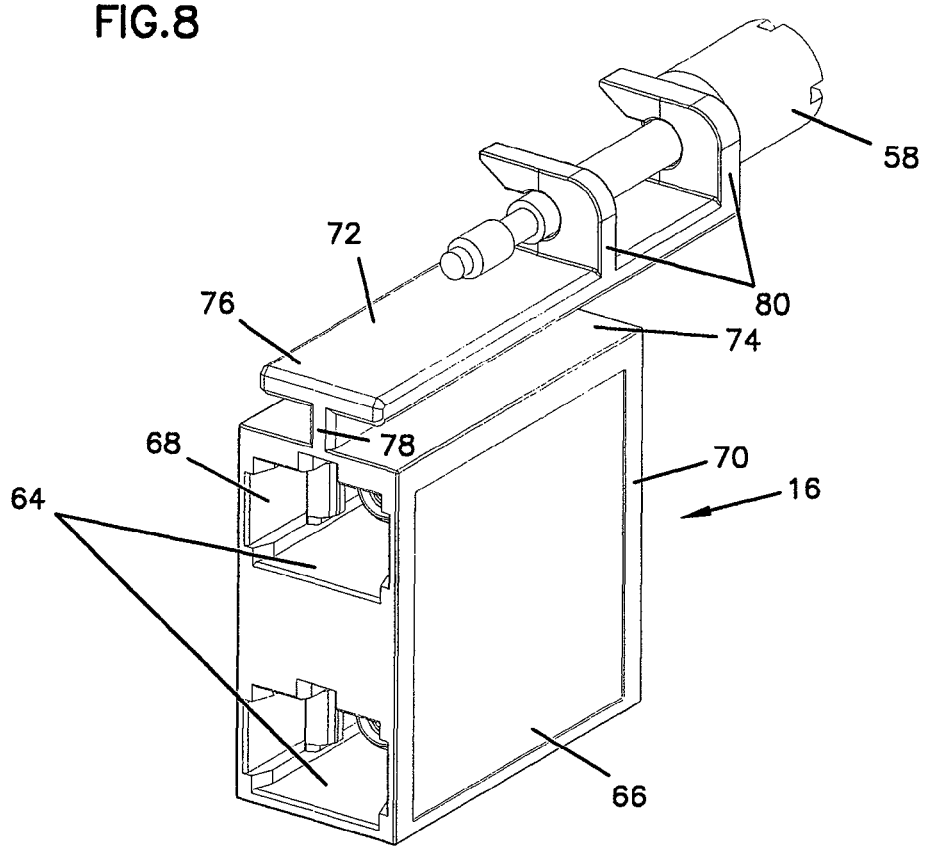
FIG. 8 is a front perspective view of one of the adapter assemblies of FIG. 1.
Figure 9:
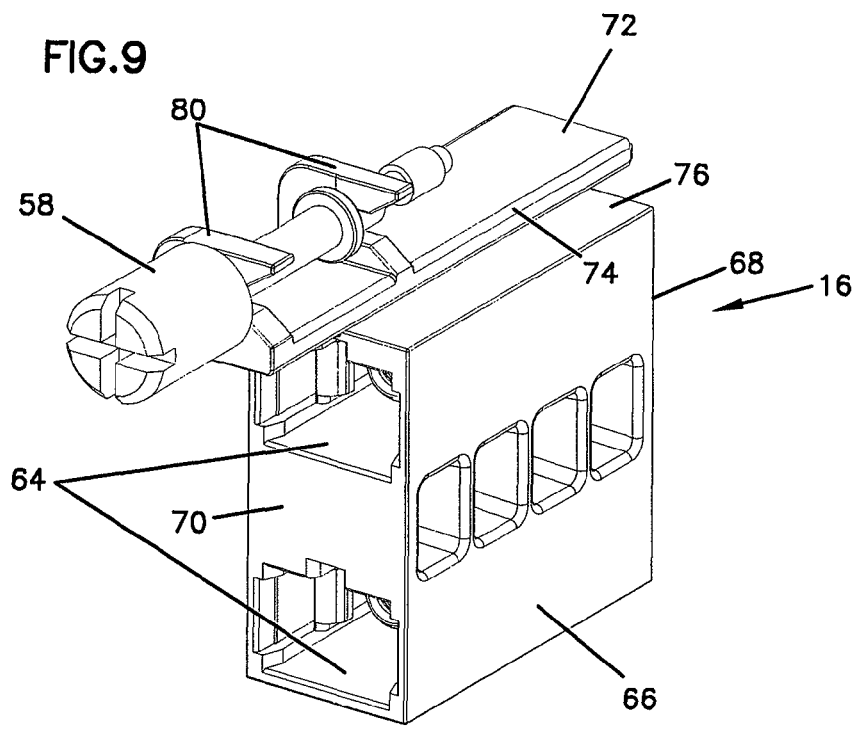
FIG. 9 is a rear perspective view of the adapter assembly of FIG. 8.
Figure 13:
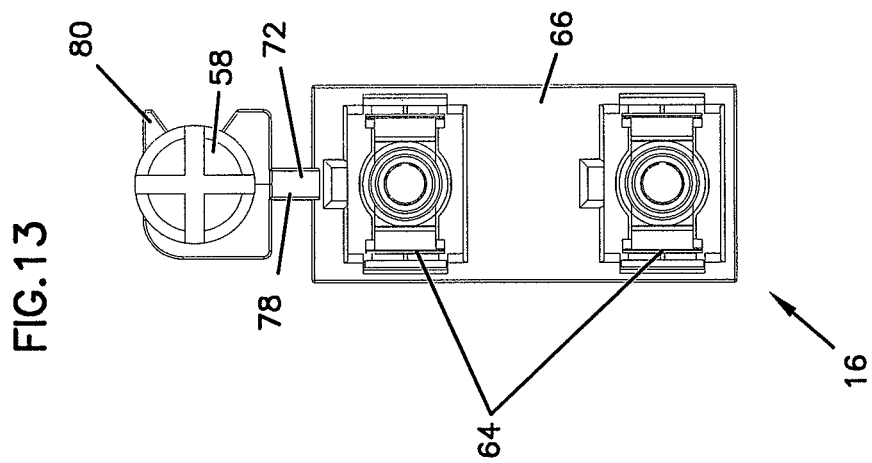
FIG. 13 is a rear view of the adapter assembly of FIG. 8.
Figure 10:
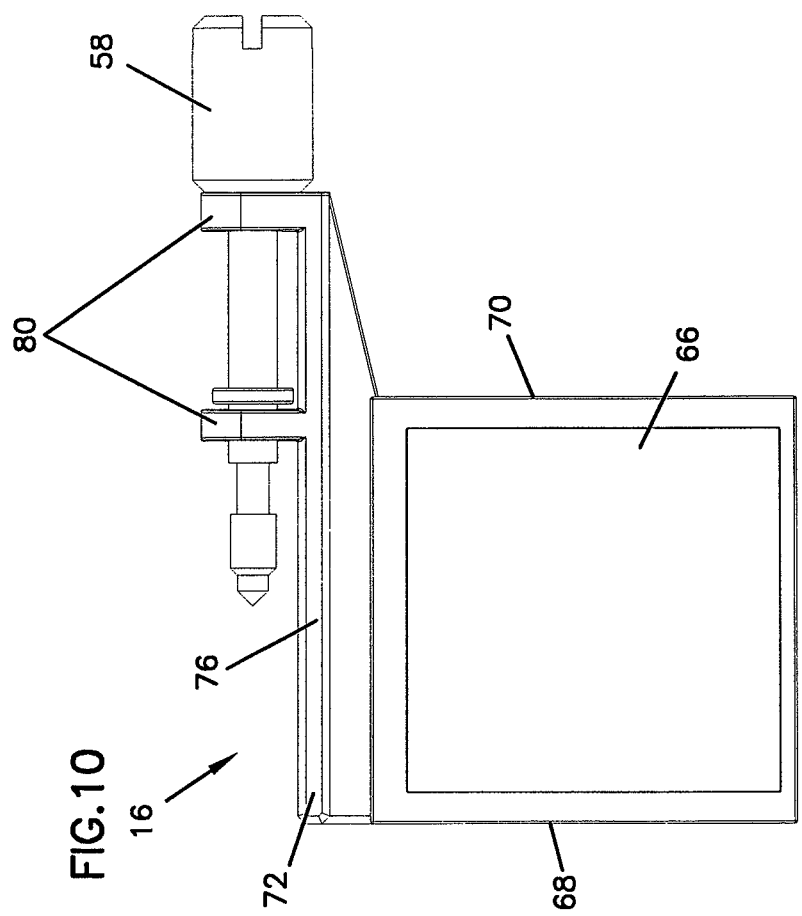
FIG. 10 is a right side view of the adapter assembly of FIG. 8.
Figure 12:
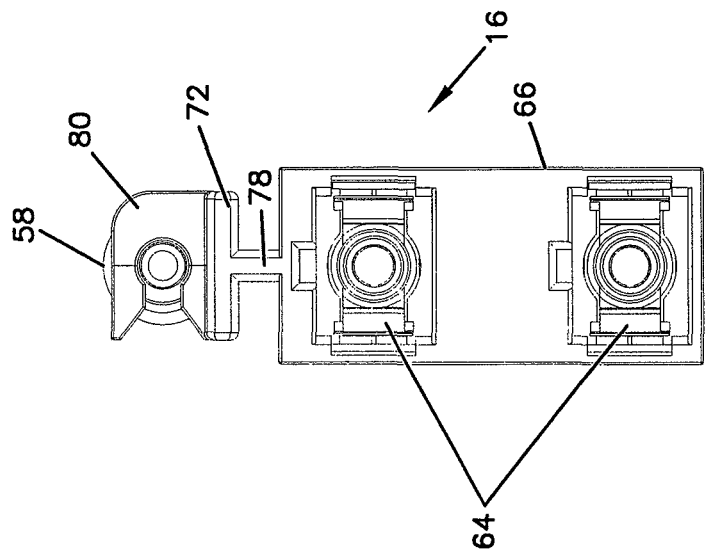
FIG. 12 is a front view of the adapter assembly of FIG. 8.
Figure 11:
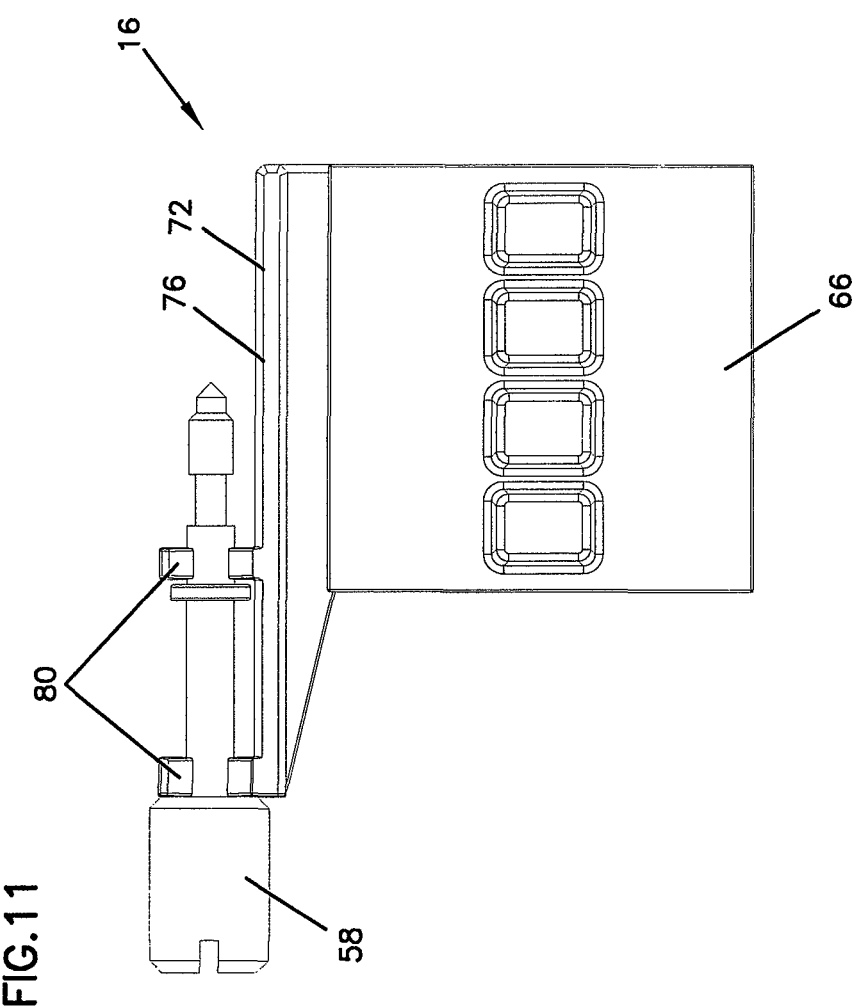
FIG. 11 is a left side view of the adapter assembly of FIG. 8.
Figure 14:
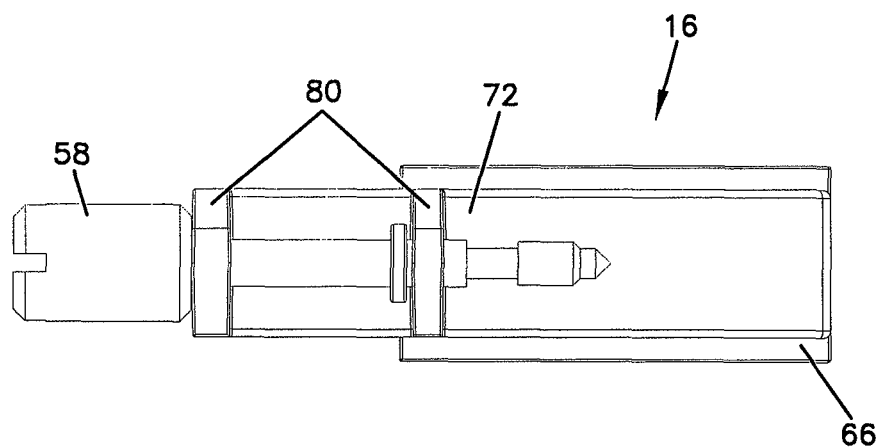
FIG. 14 is a top view of the adapter assembly of FIG. 8.
Figure 15:
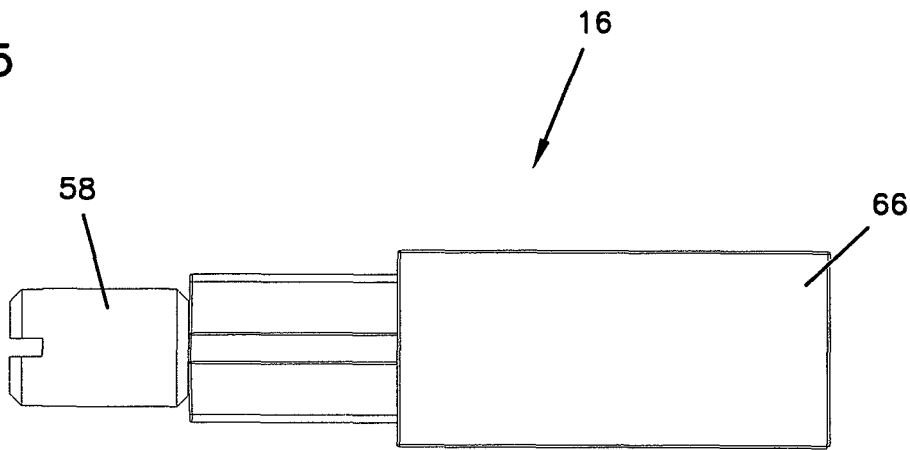
FIG. 15 is a bottom view of the adapter assembly of FIG. 8.
Figure 19:
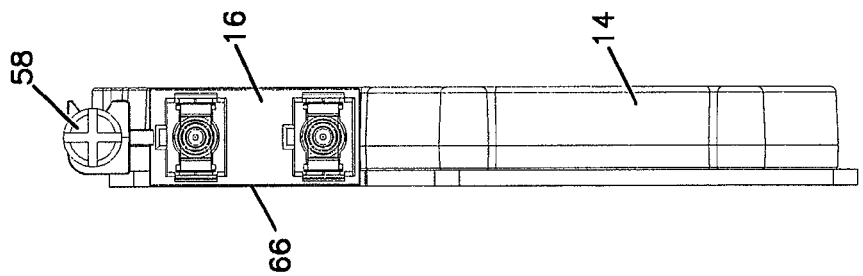
FIG. 19 is a rear view of the fiber optic splitter module and adapter assembly of FIG. 16.
Figure 16:
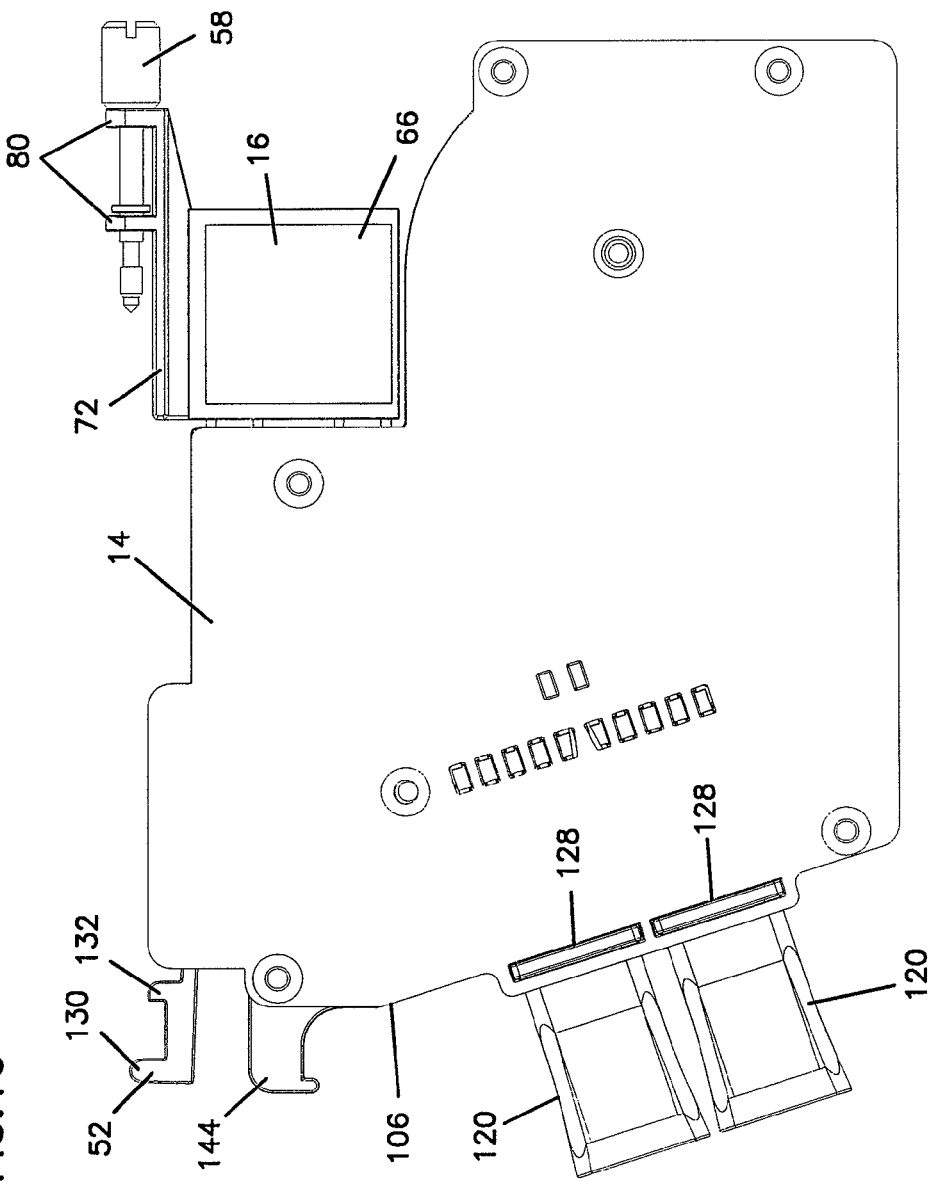
FIG. 16 is a right side view of one of the fiber optic splitter modules of FIG. 1, shown with an adapter assembly mounted thereon.
Figure 20:
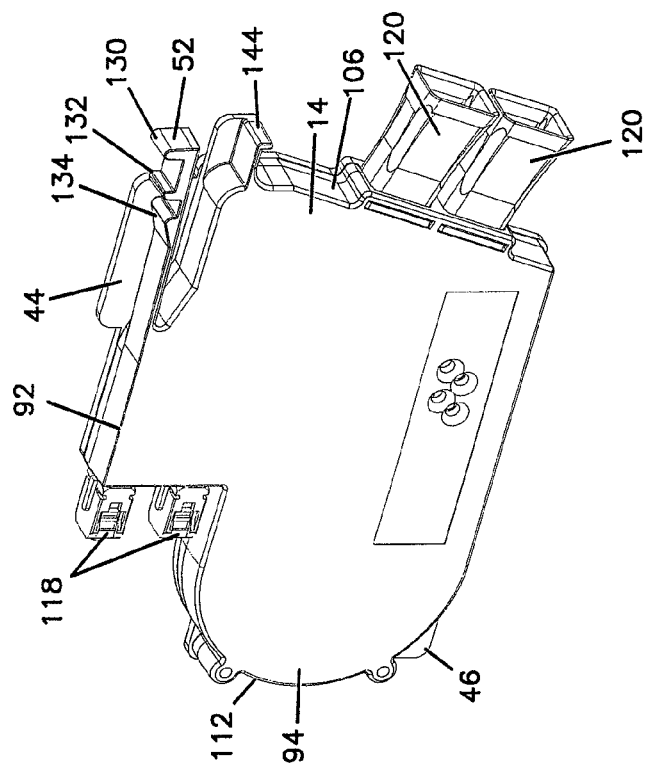
FIG. 20 is a front perspective view of the fiber optic splitter module of FIG. 16, shown in isolation without an adapter assembly mounted thereon.
Figure 21:
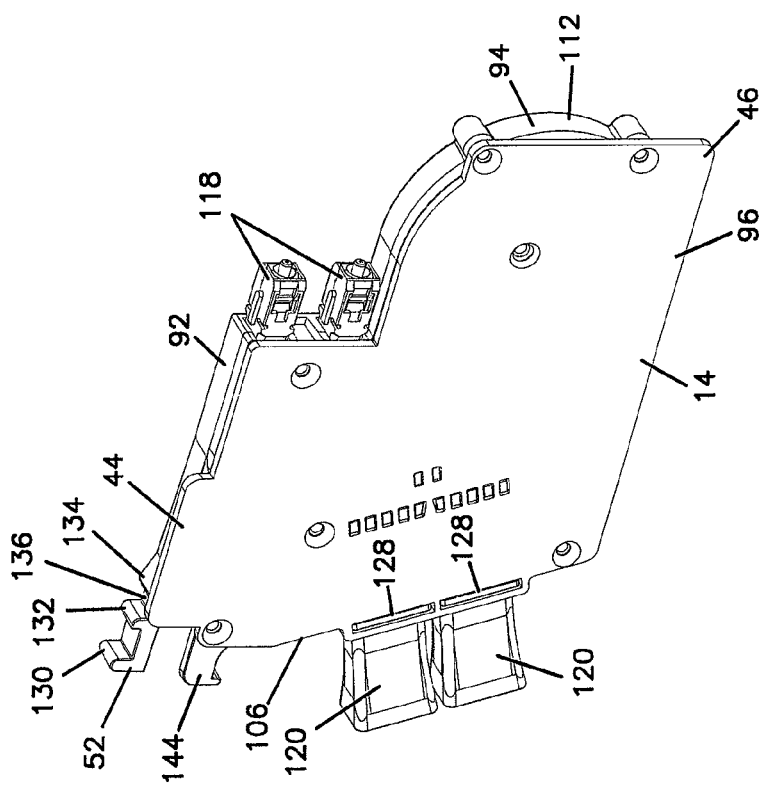
FIG. 21 is a rear perspective view of the fiber optic splitter module of FIG. 20.

Referring to FIGS. 1 and 7, at rear end 28 of chassis 12, each bulkhead 48 defines a rear face 54 with a fastener hole 56 for receiving a fastener 58 (e.g., a thumbscrew) of an adapter assembly 16 for mounting adapter assembly 16 to chassis 12. In the embodiment shown, fastener hole 56 is threaded to receive a screw-type fastener. It should be noted that in other embodiments, other types of fastening structures may be used to mount adapter assembly 16 to rear 28 of chassis 12.

Adjacent rear end 28, each bulkhead 48 also includes a horizontal slot 60 and a vertical slot 62 that complement the shape of adapter assembly 16 to slidably receive adapter assembly 16.

FIGS. 8-15 illustrate adapter assembly 16 according to the invention. Adapter assemblies 16 form connection locations between the connectors terminated to an incoming fiber optic cable and the connectors of splitter modules 14 mounted within chassis 12.

Referring to FIGS. 8-15, adapter assembly 16 includes two integrated adapters 64 formed as a part of a unitary housing 66. In other embodiments, other number of adapters are also possible. Each adapter 64 of adapter assembly 16 includes a front end 68 and a rear end 70. Front end 68 of each adapter 64 receives a connector of fiber optic splitter module 14 and rear end 70 receives a connector terminated to an incoming fiber optic cable.

Adapter assembly housing 66 includes a chassis-mounting slide 72 extending from a top 74 of housing 66, which is received within chassis 12 through rear end 28. Slide 72 defines a horizontal portion 76 and a vertical portion 78. Horizontal portion 76 is configured to be slidably received within horizontal slot 60 of bulkhead 48 and vertical portion 78 is configured to be slidably received within vertical slot 62 of bulkhead 48.

Chassis-mounting slide 72 includes a pair of flanges 80 for supporting a fastener 58 for securing adapter assembly 16 to chassis 12. As discussed earlier, fastener 58 is positioned within an opening 56 defined by rear face 54 of bulkheads 48 located underneath top wall 18 of chassis 12. Fastener 58 is preferably a captive fastener. In the embodiment of the adapter assembly shown in the figures, fastener 58 is a thumbscrew. In other embodiments, other types of fasteners may be used.

Figure 35:
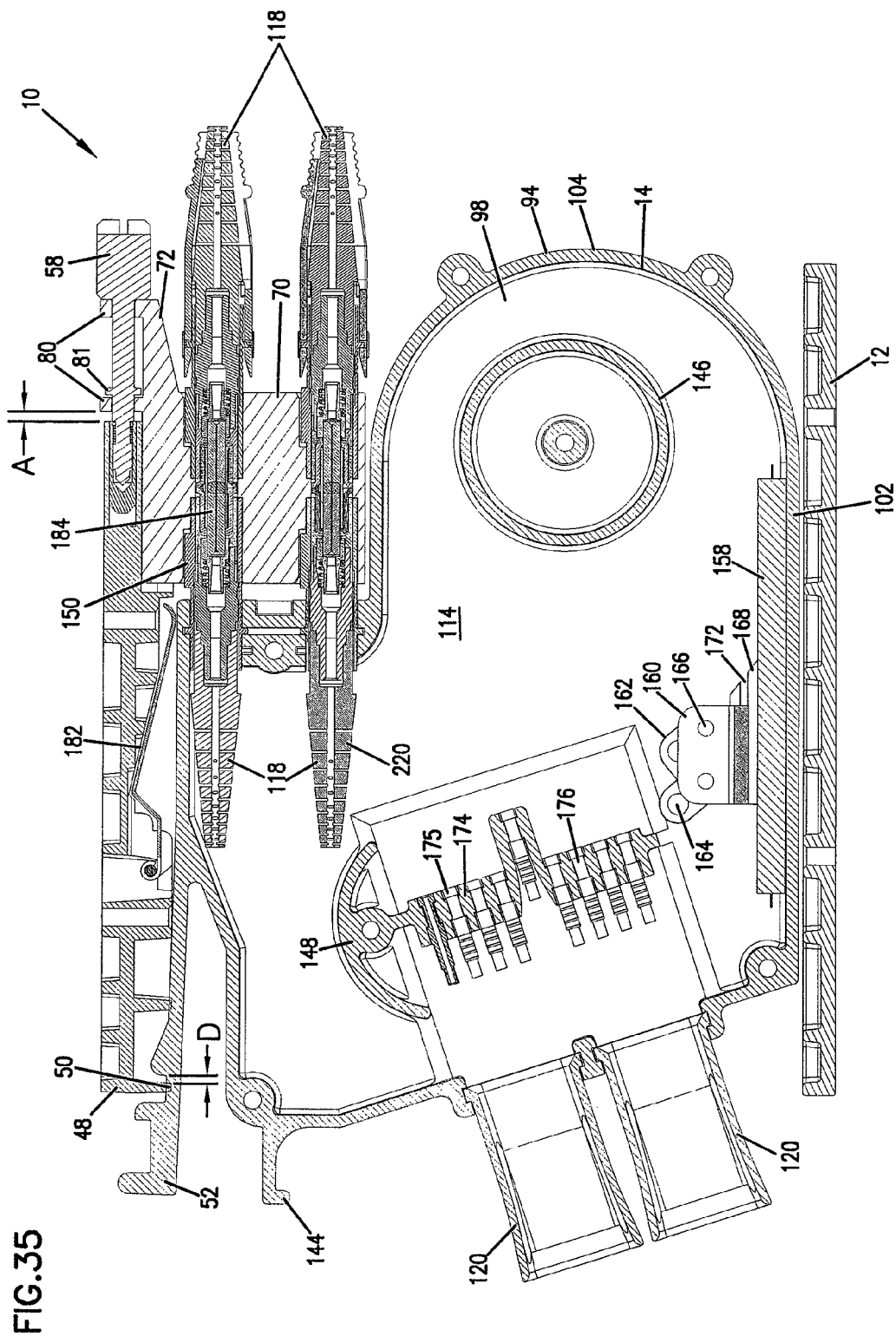
FIG. 35 is a side cross-sectional view of the fiber optic splitter module of FIG. 33 within the chassis, taken through the center of the fiber optic splitter module.
Figure 36:
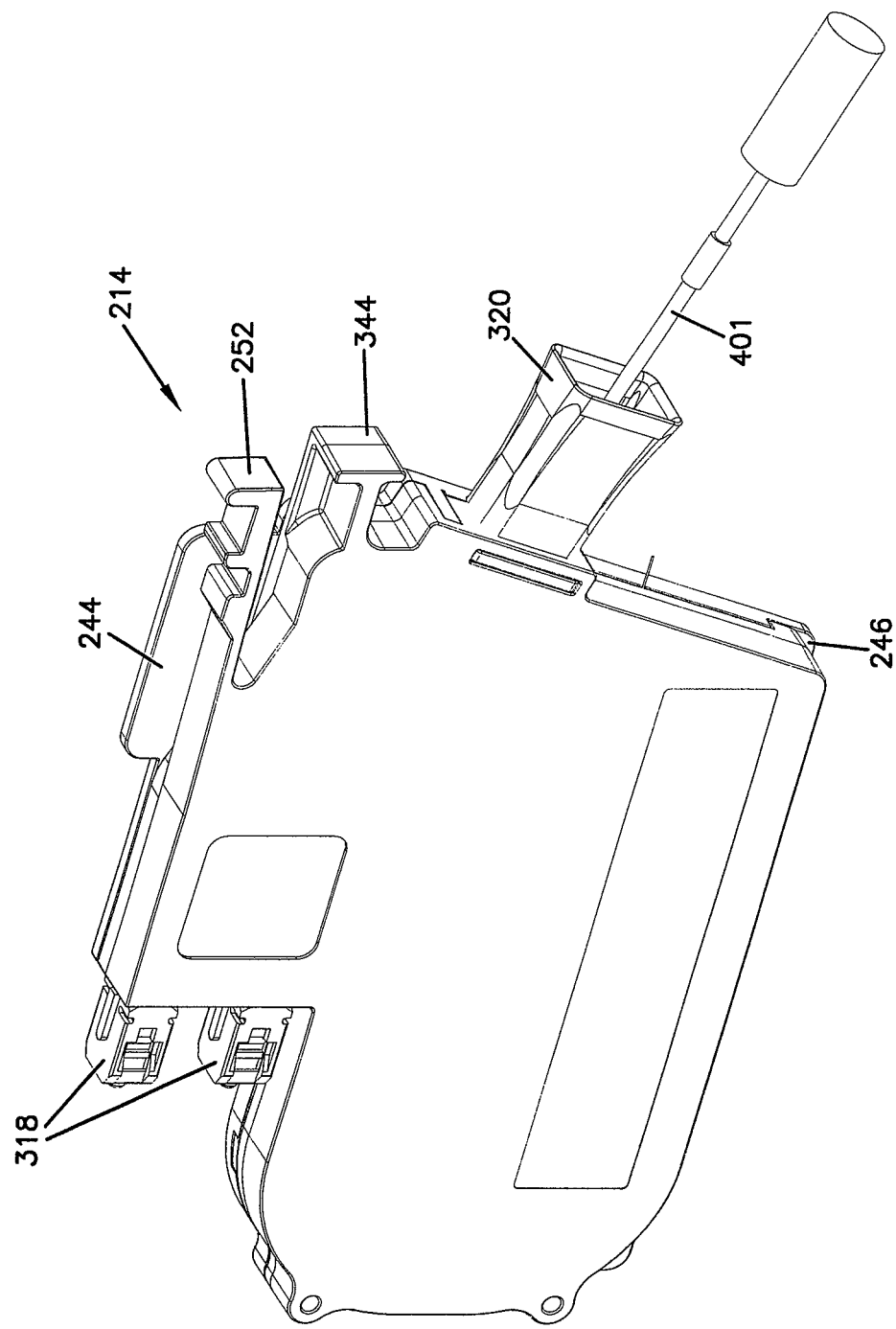
FIG. 36 illustrates a front perspective view of a fiber optic wavelength-division multiplexing (WDM) module having features that are examples of inventive aspects in accordance with the present disclosure, the WDM module configured to be inserted within the chassis that is shown in FIGS. 1-6.
Figure 37:
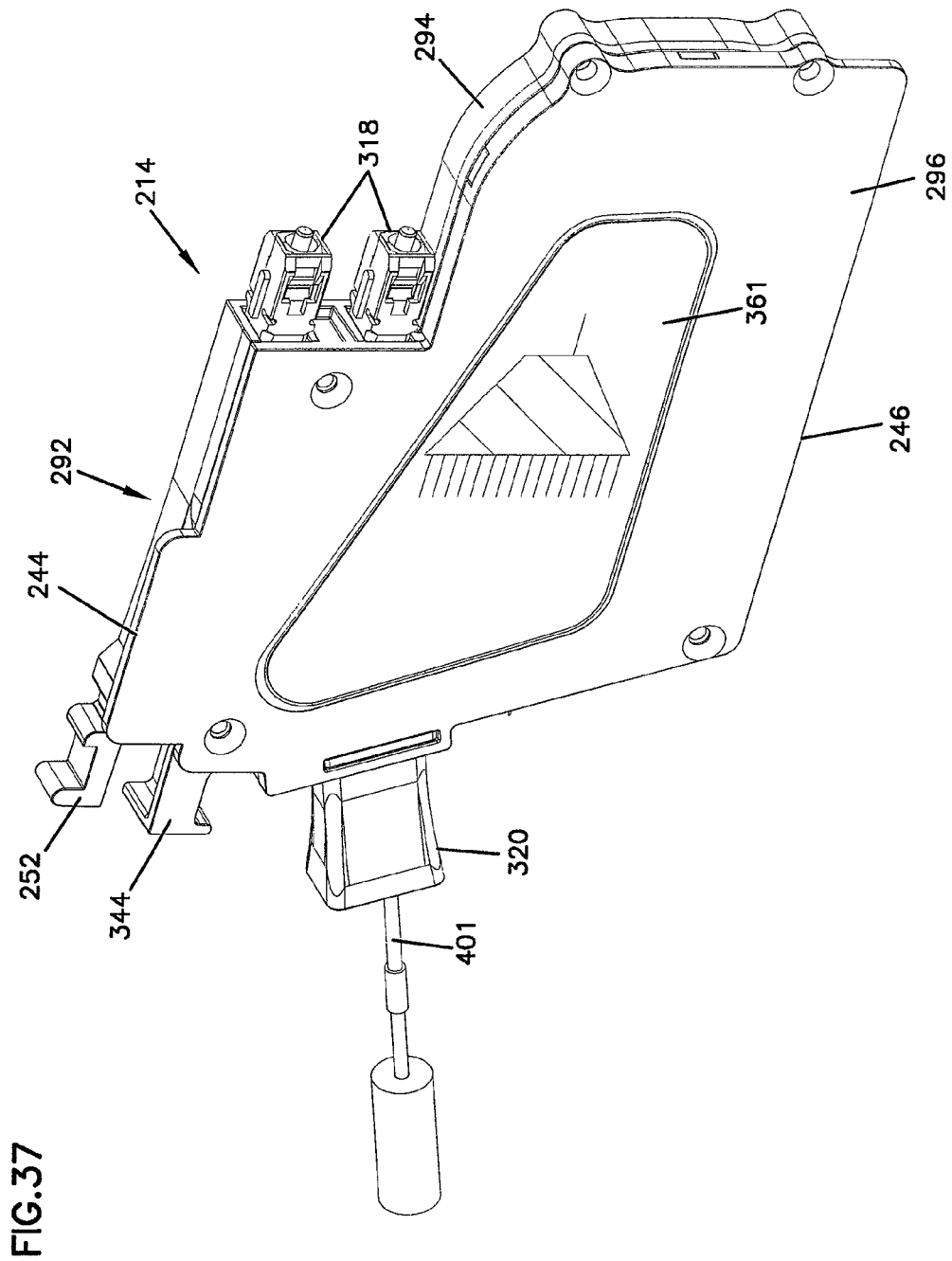
FIG. 37 is a rear perspective view of the WDM module of FIG. 36.

Fastener 58 is rotated to threadingly couple the adapter assembly 16 to the bulkheads 48. Fastener 58 is also configured such that it is able to provide adapter assembly 16 with a predetermined amount of horizontal float relative to the chassis 12 once mounted thereon. As illustrated in FIGS. 8-14, the fastener 58 of the adapter assembly 16 includes a flange 81. The fastener 58 is able to move horizontally within the flanges 80 relative to the adapter assembly housing 66. As shown in FIG. 35, once mounted to the chassis 12, the adapter assembly housing 66 is able to float or move horizontally with respect to the fastener 58 between flange 81 and the rear face of the bulkhead 48. For example, in FIG. 35, adapter assembly 16 is shown to be able to move or float a distance of A toward the rear end of chassis 12. In this manner, when a splitter module 14 is slidably pulled out of chassis 12 during disengagement, adapter assembly 16 is able to horizontally float a distance A towards splitter module 14 as the engaged connector 118 of splitter module 14 pulls on adapter 64 of adapter assembly 16. In this manner, adapter assembly 16 is provided with a certain amount of horizontal float when being engaged to and disengaged from splitter module 14.

Elements of each adapter 64 are positioned through a side opening into adapter recesses formed within the adapter assembly housing 66. The elements for each adapter 64 include a ferrule alignment sleeve and a pair of inner housing halves. These elements are placed within recesses in manner similar to that shown in commonly-owned U.S. Pat. No. 5,317,663, issued May 20, 1993, entitled ONE-PIECE SC ADAPTER, the disclosure of which is incorporated herein by reference. A panel closes opening and secures the elements within each adapter 64. Adapters 64 shown are for SC style connectors, although other types, styles and formats of adapters may be used within the scope of the present disclosure and connectors to mate with these alternative adapters.

A grip extension 218 (FIGS. 1 and 7) may be used with connectors 118 coupled to rear 70 of adapters 64 of adapter assembly 16. Grip extension 218 is designed to add length to the outer housing 150 of a connector 118 to facilitate access to individual connectors 118 in dense environments such as the telecommunications assembly 10. Grip extension is preferably first mounted over a cable before the cable is terminated to a connector 118. Once the connector 118 is terminated to the cable, grip extension 218 is slid over the boot portion 220 of the connector and mounted to the outer housing 150 of connector 118 as shown in FIG. 7.

In FIGS. 16-19, adapter assembly 16 is shown mounted to a fiber optic splitter module 14, outside of chassis 12.

FIGS. 20-30 illustrate one of the fiber optic splitter modules 14 according to the invention. Referring to FIGS. 20-30, the fiber optic splitter module 14 includes a splitter module housing 92. Splitter module housing 92 includes a main housing portion 94 and a removable cover 96. Main housing portion 94 includes a first transverse sidewall 98 extending between a top wall 100, a bottom wall 102, a rear wall 104, and a front wall 106. Removable cover 96 defines a second transverse wall 108 of splitter module housing 92 and closes off the open side of module main housing 94.

Figure 23:
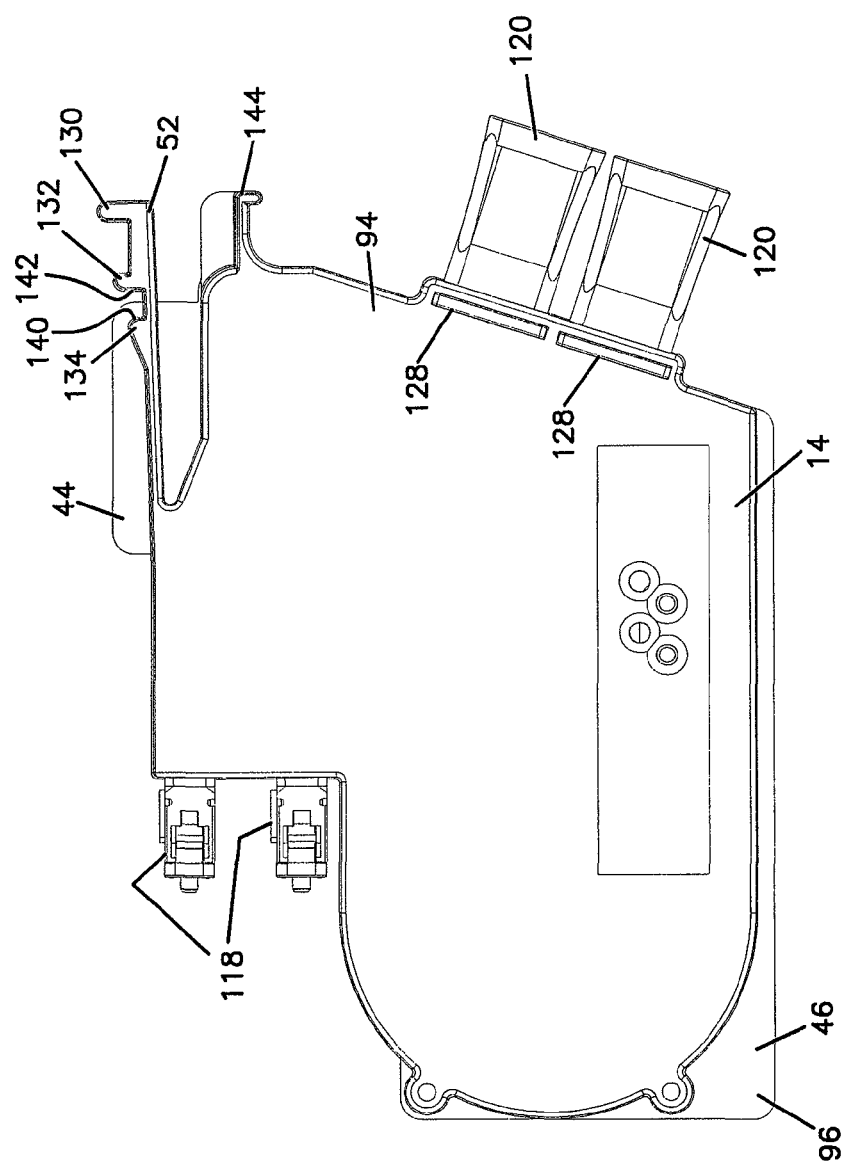
FIG. 23 is a left side view of the fiber optic splitter module of FIG. 20.
Figure 26:
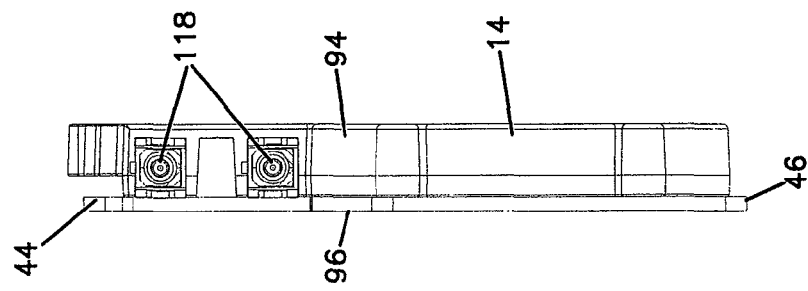
FIG. 26 is a rear view of the fiber optic splitter module of FIG. 20.
Figures 27, 28:
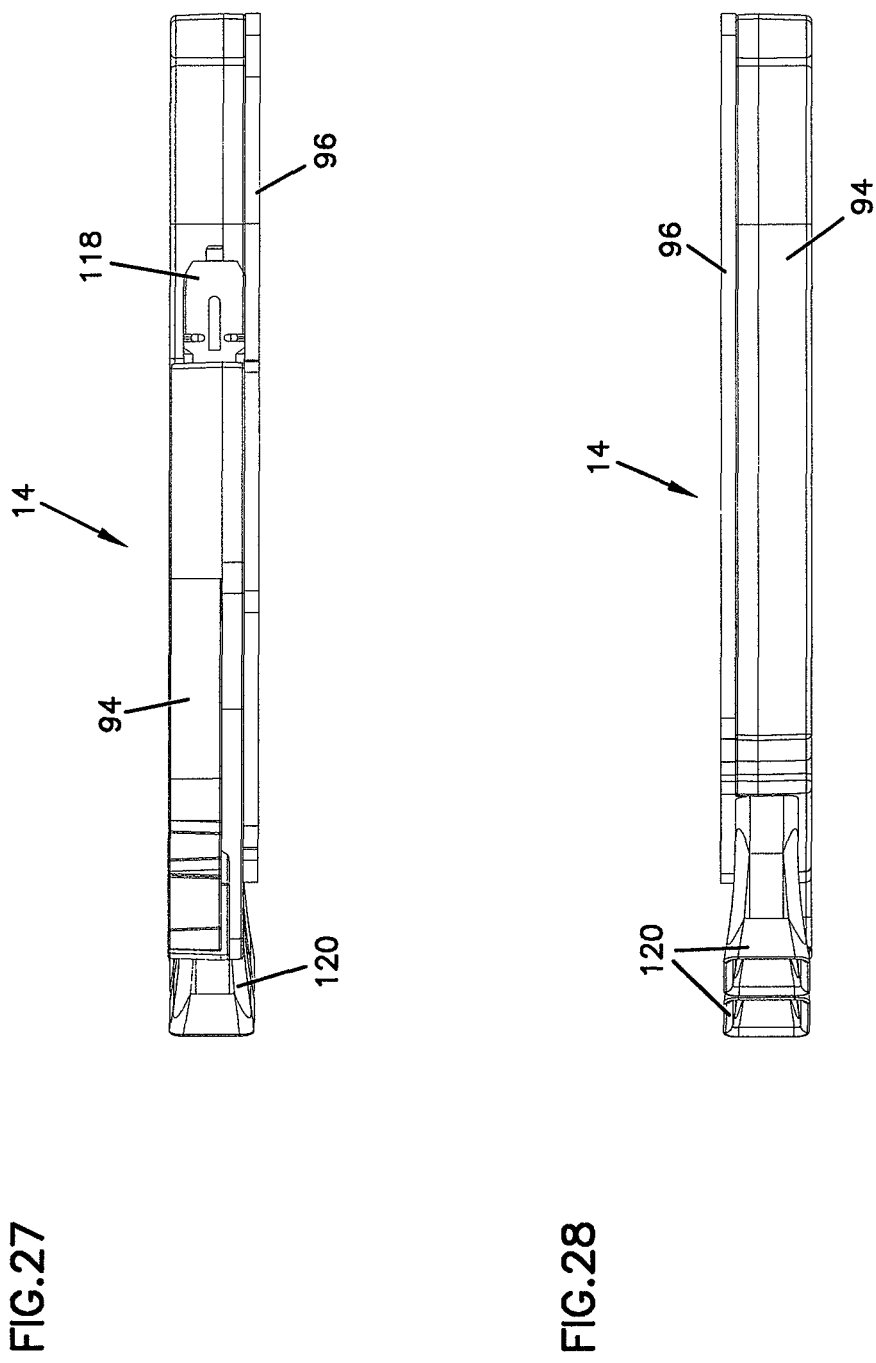
FIG. 27 is a top view of the fiber optic splitter module of FIG. 20.
FIG. 28 is a bottom view of the fiber optic splitter module of FIG. 20.

Cover 96 is mounted to main housing portion 94 by fasteners (not shown) through fastener mounts 110 defined on main housing portion 94. Cover 96 extends beyond first transverse sidewall 98 to form a top mounting flange 44 and a bottom mounting flange 46 of splitter module 14. Referring to FIGS. 23, 25, and 26, as discussed previously, bottom flange 46 of splitter module housing 92 and the corresponding slot 42 on chassis 12 are smaller in size than top flange 44 and the corresponding top slot 40 on chassis 12. Bottom slot 42 is sized so that, while bottom flange 46 may be received within slot 42, the larger top flange 44 will not fit. This ensures that modules 14 are positioned within front opening 30 in a particular desired orientation. Similar flanges are described in commonly-owned U.S. Pat. No. 5,363,465, issued Nov. 8, 1994, entitled FIBER OPTIC CONNECTOR MODULE, the disclosure of which is incorporated herein by reference. In this manner, fiber optic modules 14 are oriented correctly to be coupled to adapter assemblies 16 mounted adjacent rear 28 of chassis 12 at each mounting location 38.

Rear wall 104 of main housing portion 94 includes a curved portion 112 configured to provide bend radius protection to cables within interior 114. Rear wall 104 of main housing 92 also includes an inset portion 116. A pair of fiber optic connectors 118 positioned at inset portion 116 protrude rearwardly from rear wall 104 for mating with fiber optic adapters 64 of adapter assemblies 16 mounted within chassis 12.

As shown in FIGS. 5 and 6, front wall 106 of module main housing 94 is angled with regard to front opening 30 of chassis 12, which may aid in the direction of cables exiting module 14 toward a desired location. In other embodiments, front walls 106 could be made generally parallel to front 32 of chassis 12 within the scope of the present disclosure.

Figure 22:
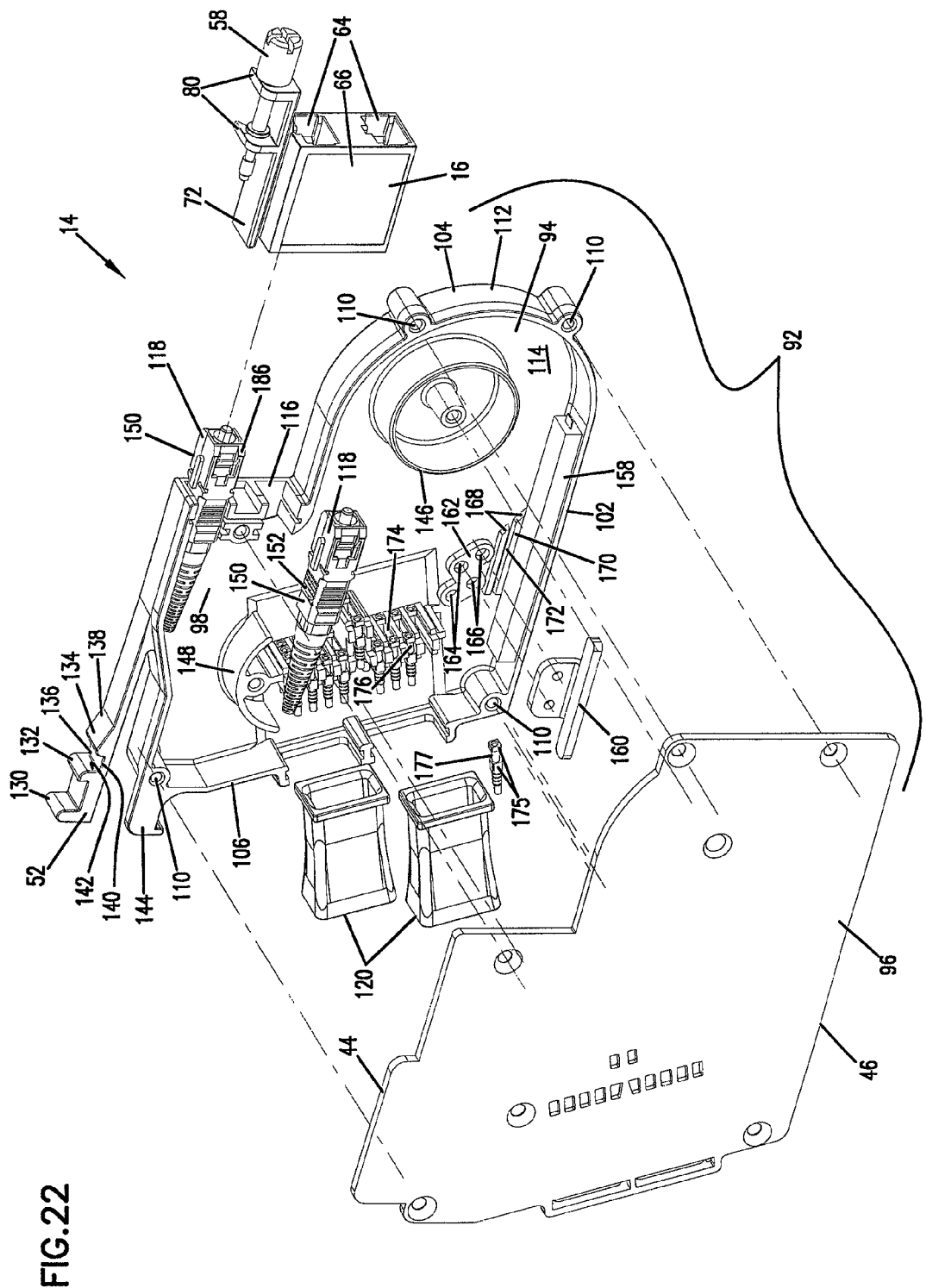
FIG. 22 is an exploded view of the fiber optic splitter module of FIG. 16, shown with the adapter assembly exploded from the fiber optic splitter module.

Each module 14 includes two cable exits 120 extending from front wall 106 of module main housing 94. As shown in FIG. 22, cable exits 120 are slidably mounted to main housing 94 of module 14 and captured by cover 96 of module 14 when cover 96 is mounted to main housing 94. Cable exits 120 define a protruding rear lip 122 that is slidably inserted into slots 124 defined around front apertures 126 for accommodating cable exits 120. Cover 96 also includes slits 128 that receive rear lips 122 of the cable exits 120 to capture cable exits 120. Cable exits 120 permit telecommunications cables within module 14 to be directed outside of module 14. Cable exits 120 are preferably sized thin enough to fit within the profile of the fiber optic splitter module 14, as shown in FIG. 25, to preserve the density of the telecommunications assembly 10.

Main housing 94 includes an integrally formed flexible latch 52 (i.e., cantilever arm) that is adapted to engage a portion of chassis 12 to hold module 14 within front opening 30 of chassis 12. Flexible latch 52 also deflects to permit withdrawal of module 14 from chassis 12.

Still referring to FIGS. 20-30, latch 52 of module 14 includes a finger grip tab 130, a front latching tab 132 and a rear latching tab 134. Front latching tab 132 and rear latching tab 134 define a recess 136 therebetween. Rear latching tab 134 includes a ramped face 138 that causes latch 52 to elastically deflect down when module 14 is being inserted into chassis 12. Rear latching tab 134 also includes a square face 140 that opposes a square face 142 of front latching tab 132.

Front lip 50 of bulkhead 48 at mounting location 38 of chassis 12 is captured in recess 136 between the two latching tabs 132, 134 to hold module 14 in place within chassis 12. During insertion, as front lip 50 of bulkhead 48 clears ramped rear tab 134 and is captured in recess 136 between the two latching tabs 132, 134, latch 52 flexes back upwardly. Recess 136 between the two tabs 132, 134 of latch 52 allows for a certain amount of horizontal float for splitter module 14 within chassis 12, as will be discussed in further detail below.

The removal of module 14 from chassis 12 is performed by pressing latch 52 downwardly to clear the square face 140 of rear tab 134 from lip 50 and sliding module 14 away from chassis 12. Module 14 includes a fixed grip tab 144 opposing and adjacent to flexible latch 52 to aid removal of module 14 from chassis 12. Fixed grip tab 144 is formed as a part of front wall 106 of module 14. Fixed grip tab 144 is preferably positioned on module 14 opposite latch 52 so that a user may apply opposing force on latch 52 and fixed grip tab 144 to securely grasp module 14 and remove it from chassis 12. Fixed grip tab 144 is preferably positioned on module 14 close enough to latch 52 so that a user may be apply the force with two adjacent fingers of the hand.

FIG. 22 shows an exploded view of fiber optic splitter module 14 illustrating the internal components of module 14. Fiber optic splitter module 14 is shown in FIG. 22 with adapter assembly 16 exploded from module 14.

Within interior 114 of main housing 94, splitter module 14 includes a first radius limiter 146 adjacent curved portion 122 of rear wall 104 of main housing 94. Splitter module 14 includes a second radius limiter 148 adjacent front wall 106 of housing 94 near cable exits 120. Connectors 118 of splitter module 14 are slidably inserted into opposing slots 154 formed in apertures 156 at the rear wall 104. Connectors 118 project out from rear wall 104 at inset portion 116 of rear wall 104. Outer housings 150 of connectors 118 include transverse flanges 152 that are received within the opposing slots 154 formed in apertures 156 that accommodate the connectors 118. Once slidably inserted, connectors 118 are captured within housing 92 by cover 96.

Adjacent bottom wall 102 of main housing 94 within interior 114 is an optical component 158 such as a fiber optic splitter or a fan-out. Optical component 158 is held against the interior of bottom wall 102 by a clamp 160 (i.e., bracket). Clamp 160 is mounted to a clamp mount 162 defined on splitter module main housing 94 with fasteners (not shown). In the embodiment of the housing 94 shown in the figures, clamp mount 162 includes two pairs of mounting holes 164, 166. Either the upper set of holes 164 or the lower set of holes 166 are utilized depending upon the size of the clamp that will be used to hold optical component 158 against bottom wall 102. It should be noted that different optical components may have different thicknesses and may require the use of different sized clamps for holding the optical components in place. In certain embodiments, two optical components that are stacked on top of another may be used, in which case, a smaller clamp would be used to hold the two optical components in place.

Optical component 158 is offset from the interior side of first transverse sidewall 98 by a set of cable management structures 168. In the embodiment of the module 14 illustrated, the set of cable management structures 168 are elongate structures 170 defining cable management slits 172 therein between. When optical component 158 is held in place, cables can be routed through slits 172 between optical component 158 and the interior of first transverse wall 98 (please see FIGS. 29 and 30).

Splitter module main housing 94 also includes integrally formed crimp holders 174 (e.g., slots) adjacent front wall 106 of housing 94 underneath second radius limiter 148. Crimp elements 176 crimped to the ends of cables that are split by optical component 158 are slidably received into crimp holders 174 as shown in FIGS. 22 and 29. Crimp elements 176 define square flanges 175 between which is defined a recessed portion 177. The crimp holders 174 include complementary structure to the crimp elements such that once the crimp elements 176 are slidably inserted into the crimp holders 174, the crimp elements 176 are prevented from moving in a longitudinal direction due to the flanges 175. Once slidably inserted, crimp elements 176 are held in place by cover 96 that is mounted to splitter module main housing 94. In the embodiment shown, there are nine crimp holding slots 174, each one being able to accommodate up to four crimp elements 176. Other numbers are possible. Other complementary shapes between the crimp elements and the crimp holding slots are also possible to provide a slidable fit and to prevent axial movement of the crimp elements once inserted therein the crimp holders.

FIG. 29 shows fiber optic splitter module 14 without a cover 96 exposing the interior features of fiber optic splitter module 14 including routing of a fiber optic cable within fiber optic splitter module 14. FIG. 30 illustrates a cross-sectional view taken along section line 30-30 of FIG. 29.

As shown in FIG. 29, a first cable 178 extends from connector 118 toward optical component 158, mounted within module housing 92. Optical component 158, as previously discussed, may be a splitter or a fan-out or another type of optical component. In the embodiment shown, optical component 158 is a fiber optic splitter that splits the signal of a single strand to a plurality of secondary signals. In another embodiment, first cable 178 may be a multi-strand fiber cable with a plurality of strands of optical fiber and optical component may be a fanout to separate the individual strands into each of a plurality of second cables.

First cable 178, as it extends toward optical component 158, is inserted through slits 172 (see FIGS. 22, 29, and 30) located between optical component 158 and the inner side of first transverse sidewall 98 of module housing 94 and looped around first radius limiter 146 and then around second radius limiter 148 before being received by optical component 158. Second cables 180 extend from optical component 158 and are looped again all the way around first radius limiter 146 before heading toward crimp holders 174. From crimp holders 174, cables (not shown) crimped to the other ends of the crimps 176 exit the module through module exits 120.

An outside cable (not shown) may extend to rear end 70 of an adapter 64 of adapter assembly 16 and be terminated by a connector (not shown in FIG. 29) that is optically connected to connector 118 of module 14 through adapter 64 once module 14 is inserted within chassis 12. It should be noted that the routing of the fiber optic cables within module 14 as shown in FIGS. 29 and 30 is only one example and other ways of routing the cables within the module are possible.

The embodiment of the fiber optic splitter module 14 shown in the figures is configured such that it can accommodate reduced bend radius fiber. A reduced bend-radius fiber may have a bend radius of about 15 mm whereas a non-reduced bend-radius fiber may have a bend radius of about 30 mm.

Similar fiber optic splitter modules are described in commonly-owned U.S. patent application Ser. Nos. 10/980,978 (filed Nov. 3, 2004, entitled FIBER OPTIC MODULE AND SYSTEM INCLUDING REAR CONNECTORS); 11/138,063 (filed May 25, 2005, entitled FIBER OPTIC SPLITTER MODULE); 11/138,889 (filed May 25, 2005, entitled FIBER OPTIC ADAPTER MODULE); and 11/215,837 (filed Aug. 29, 2005, entitled FIBER OPTIC SPLITTER MODULE WITH CONNECTOR ACCESS), the disclosures of which are incorporated herein by reference.

The insertion of a splitter module 14 into chassis 12 is illustrated in FIGS. 31-35. Referring to FIGS. 31-35, insertion of fiber optic module 12 into front opening 30 of chassis 12 begins the mating of module 14 to chassis 12 and to adapters 64 of adapter assembly 16. Top flanges engage 44 top slots 40 and bottom flanges 46 engages bottom slots 42 of chassis 12 as module 14 is inserted.

Still referring to FIGS. 31-35, chassis 12 includes a flexible shield 182 in each mounting location 38. Shield 182 is adapted to prevent protection against accidental exposure to light. Shield 182 is positioned in front end 68 of each adapter 64 of adapter assembly 16. Before a splitter module 14 is placed in an associated mounting location 38, if a connectorized cable that is connected to an adapter 64 of adapter assembly 16 is illuminated and transmitting light signals, shield 182 will prevent accidental exposure to these signals which might damage eyes or other sensitive organs, or nearby communications equipment. The insertion of splitter module 14 pushes shield 182 out of the way as illustrated in FIGS. 31-33.

Shield 182 is deflected by module 14 as module 14 is inserted through front opening 30 so that connectors 118 of module 14 can mate with adapters 64 of adapter assemblies 16. Shield 182 is preferably made of a resilient deformable material that will return to the position when module 14 is withdrawn from mounting location 38.

Figure 34:
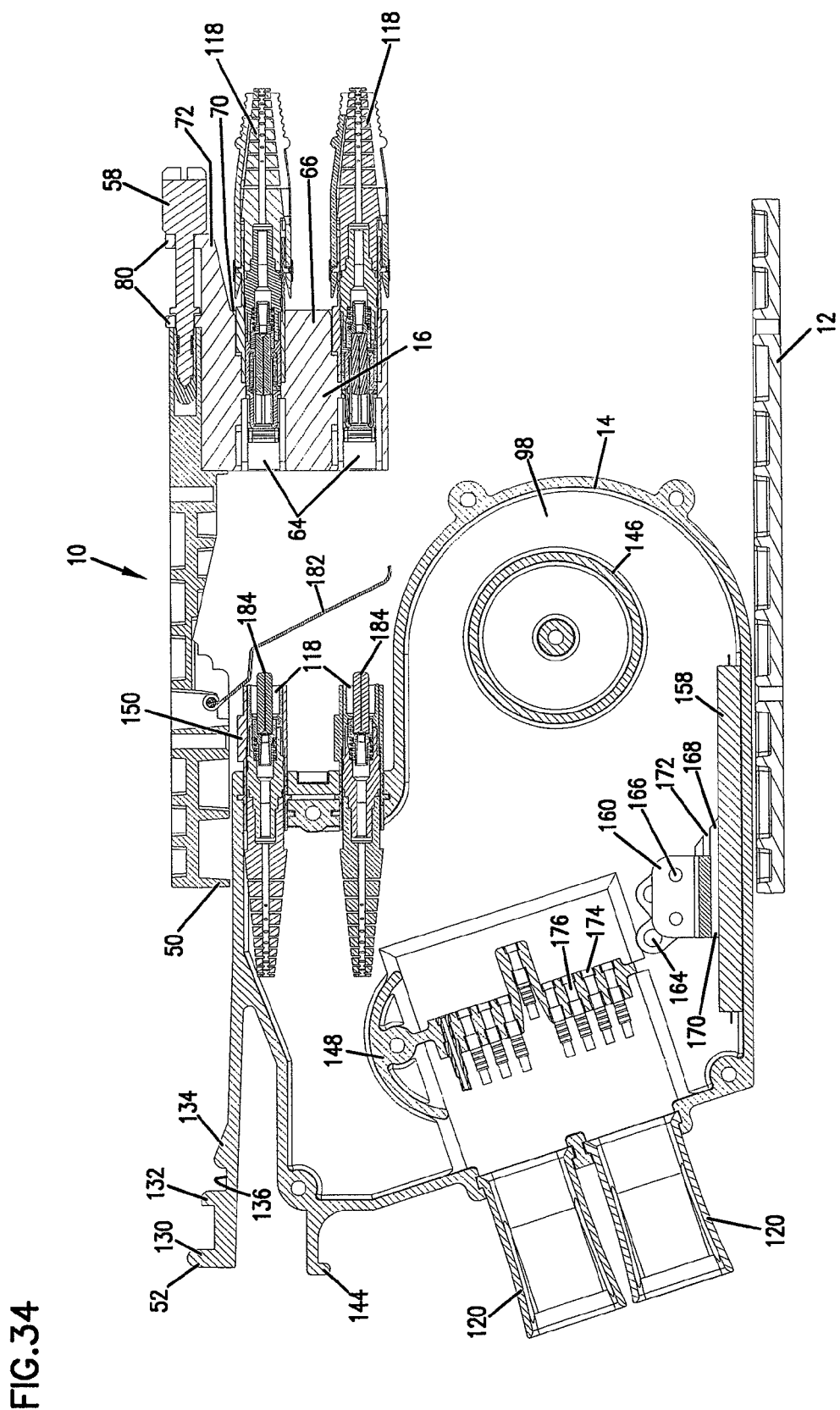
FIG. 34 is a side cross-sectional view of the fiber optic splitter module of FIG. 32 within the chassis, taken through the center of the fiber optic splitter module.

For example, in FIG. 31, a fiber optic splitter module 14 is shown partially inserted within chassis 12 prior to connectors 118 of splitter module 14 having contacted shield 182 of chassis 12. In FIG. 32, fiber optic splitter module 14 is shown in a position within chassis 12 with connectors 118 of fiber optic splitter module 14 making initial contact with shield 182 of chassis 12 to move shield 182 out of the way (a side cross-sectional view is shown in FIG. 34). In FIG. 33, fiber optic splitter module 14 is shown in a fully inserted position within chassis 12, having moved shield 182 out of the way (a side cross-sectional view is shown in FIG. 35).

Shield 182 is configured such that shield 182 does not engage the ferrule 184 of connector 118 of splitter module 14 when connector 118 contacts shield 182 to move it out of the way. Instead, outer connector housing 150 pushes shield 182 out of the way.

Shield 182 may be connected to chassis 12 by fasteners, or, alternatively, shield 182 may be formed integrally with chassis 12 or mounted by spot-welding or other fastening techniques.

As shield 182 is fully deflected, further insertion of module 14 brings connectors 118 into contact with adapters 64 and connectors 118 are received within front ends 68 of adapters 64. Latch 52 is deflected inwardly as module 14 is inserted and then flexes back so that front lip 50 of bulkhead 48 is captured in recess 136. Module 14 is now in position to process and transmit signals from cable through first cable 178, optical component 158 and second cable 180 within module interior 114.

Referring to FIG. 35, as noted above, recess 136 between the two tabs 132, 134 of latch 52 provides a certain amount of horizontal float for the splitter module 14 within chassis 12. Front lip 50 of bulkhead 48 is allowed to move a distance of D as indicated in FIG. 35 before it makes contact with square face 140 of rear tab 134. Splitter module 14 is configured such that, when splitter module 14 is pulled away from front 32 of chassis 12, distance D front lip 50 of bulkhead 48 travels before contacting square face 140 of rear tab 134 is less than the horizontal float (i.e., distance A) provided for adapter assembly 16, as discussed before.

In this manner, splitter module 14 provides a form of protection from accidentally disengaging connectors 118 of the module from adapter assemblies 16 at rear 28 of chassis 12. The size of recess 136 of module 14 is configured such that the horizontal float of splitter module 14 is interrupted before the adapter assembly 16 can be pulled far enough toward the front of chassis 12 to stop its horizontal movement and accidentally disengage connectors 118 of module 14 from adapters 64.

FIGS. 36-39 illustrate a fiber optic wavelength division multiplexing (WDM) module 214 having features that are examples of inventive aspects in accordance with the present disclosure. The WDM module 214 is configured similarly to the splitter module 14 of FIGS. 20-30 in certain aspects. For example, the WDM module 214 is configured to be inserted within the chassis 12 in a similar manner as module 14. However, the WDM module 214 houses a fiber optic multiplexer/demultiplexer 358 and the features of the module 214 are configured for supporting the multiplexer/demultiplexer 358 and integrating into a telecommunications system. As will be discussed in detail, the WDM module 214 includes internal features for housing the multiplexer/demultiplexer 358 and routing and managing cables to and from the multiplexer/demultiplexer 358 and external features for integrating the multiplexer/demultiplexer 358 into a telecommunications assembly including a chassis 12, such as the telecommunications assembly 10 of FIGS. 1-7.

Figure 38:
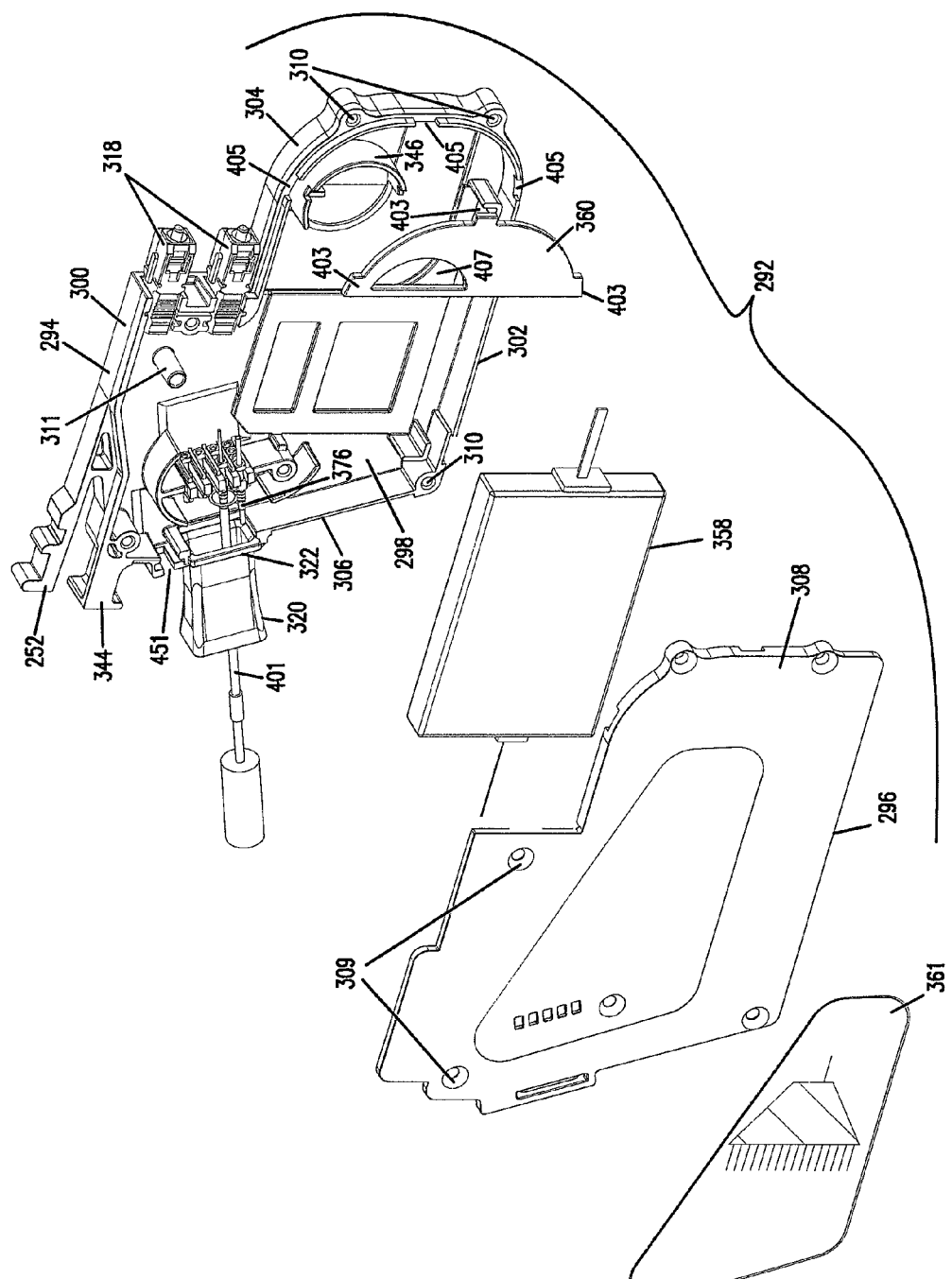
FIG. 38 is an exploded view of the WDM module of FIG. 36.

Referring to FIG. 38, the WDM module 214 is shown in an exploded orientation. WDM module 214 includes a module housing 292 that includes a main housing portion 294 and a removable cover 296. The main housing portion 294 is illustrated separately in FIGS. 40-45 and the cover 296 is illustrated separately in FIGS. 46-48. The module housing 292 is configured to house a multiplexer/demultiplexer chip 358 therewithin for multiplexing/demultiplexing signals that are input and output through connectors 318 of the module 214. The module housing 292 includes a cable exit 320 for relaying fiber signals to customers.

The WDM module 214 includes a number of cable management/routing features as will be described in further detail below. One of the cable management features includes the fiber retainer 360 that is removably mounted to the main housing portion 294 of the module housing 292, as shown in FIG. 38. As also shown in FIG. 38, a label 361 including indicia relating to the module 214 may be mounted to the cover portion 296 of the housing 292.

Still referring to FIG. 38, the main housing portion 294 defines a first sidewall 298 extending between a top wall 300, a bottom wall 302, a rear wall 304, and a front wall 306. Removable cover 296 defines a second sidewall 308 of the module housing 292 and closes off the open side of module main housing portion 294.

Cover 296 is mounted to main housing portion 294 by fasteners through fastener holes 309 in the cover 296 and fastener mounts 310 defined on main housing portion 294. Cover 296 extends beyond the first sidewall 298 to form a top mounting flange 244 and a bottom mounting flange 246 of the WDM module 214, similar to the splitter module 14 (see FIGS. 36 and 37). As discussed previously for chassis 12, the bottom flange 246 and the corresponding slot 42 on chassis 12 are smaller in size than top flange 244 and the corresponding top slot 40 on chassis 12. Bottom slot 42 is sized so that, while bottom flange 246 may be received within slot 42, the larger top flange 244 will not fit. This ensures that the WDM modules 214 are positioned within front opening 30 of the chassis 12 in a particular desired orientation to be correctly coupled to adapter assemblies 16 mounted adjacent rear 28 of chassis 12 at each mounting location 38.

Rear wall 304 of main housing portion 294 includes a curved portion 312 configured to provide bend radius protection to cables within interior of the module 214. Similar to module 14, the rear wall 304 of main housing 294 includes an inset portion 316 and a pair of fiber optic connectors 318 positioned at the inset portion 316. The connectors 318 protrude rearwardly from rear wall 304 for mating with fiber optic adapters 64 of adapter assemblies 16 mounted within chassis 12.

As shown in FIGS. 40-43, the front wall 306 of the module main housing 294 is angled with regard to front opening 30 of chassis 12, which may aid in the direction of cables exiting the WDM module 214 toward a desired location. In other embodiments, front walls could be made generally parallel to front 32 of chassis 12 within the scope of the present disclosure.

As noted above, the embodiment of the WDM module 214 illustrated includes one cable exit 320 extending from front wall 306 of module main housing 294. The cable exit 320 is slidably mounted to main housing 294 of the WDM module 214 and is captured by the cover 296 when cover 296 is mounted to main housing 294. The cable exit 320 defines a protruding rear lip 322 that is slidably inserted into a slot 324 defined around a front aperture 326 for accommodating the cable exit 320. Cover 296 also includes a slit 328 that receives the rear lip 322 of the cable exit 320 to capture the cable exit 320. The cable exit 320 permits telecommunications cables within module 214 that have been multiplexed/demultiplexed to be directed outside of module 214. The cable exit 320 is preferably sized thin enough to fit within the profile of the WDM module 214, similar to splitter module 14, as shown in FIG. 25, to preserve the density of the telecommunications assembly.

Referring to FIGS. 40-45, the main housing 294 includes an integrally formed flexible latch 252 (i.e., cantilever arm) that is adapted to engage a portion of chassis 12 to hold module within front opening 30 of chassis 12. Flexible latch 252 also deflects to permit withdrawal of module from chassis 12. The flexible latch 252 of the module 214 is constructed similarly to that of module 14 and operates in a similar manner for insertion and removal of the module from chassis 12. As in module 14, the latch 252 of module 214 includes a finger grip tab 330, a front latching tab 332 and a rear latching tab 334 that cooperate with the bulkhead 48 at the mounting location 38 of the chassis 12. The WDM module 214 also includes a fixed grip tab 344, similar to module 14, opposing and adjacent to flexible latch 252 to aid removal of module 214 from chassis 12. Fixed grip tab 344 is preferably positioned on module 214 opposite latch 252 so that a user may apply opposing force on latch 252 and fixed grip tab 344 to securely grasp module 214 and remove it from chassis 12 with two adjacent fingers of the hand. The insertion of the WDM module 214 into chassis 12 is similar to that of module 14 and is described above with respect to FIGS. 31-35.

Still referring to FIGS. 40-45, within interior of main housing 294, module 214 includes a first radius limiter 346 adjacent curved portion 322 of rear wall 304 of main housing 294. The WDM module 214 includes a second radius limiter 348 adjacent front wall 306 of housing near the cable exit 320. A third radius limiter 349 is located adjacent the front wall 306 below the second radius limiter 348. As will be discussed in further detail below, the radius limiters 346, 348, 349 provide bend-protection to fiber cables within the module 214 while providing cable management/routing functionality.

Figure 39:
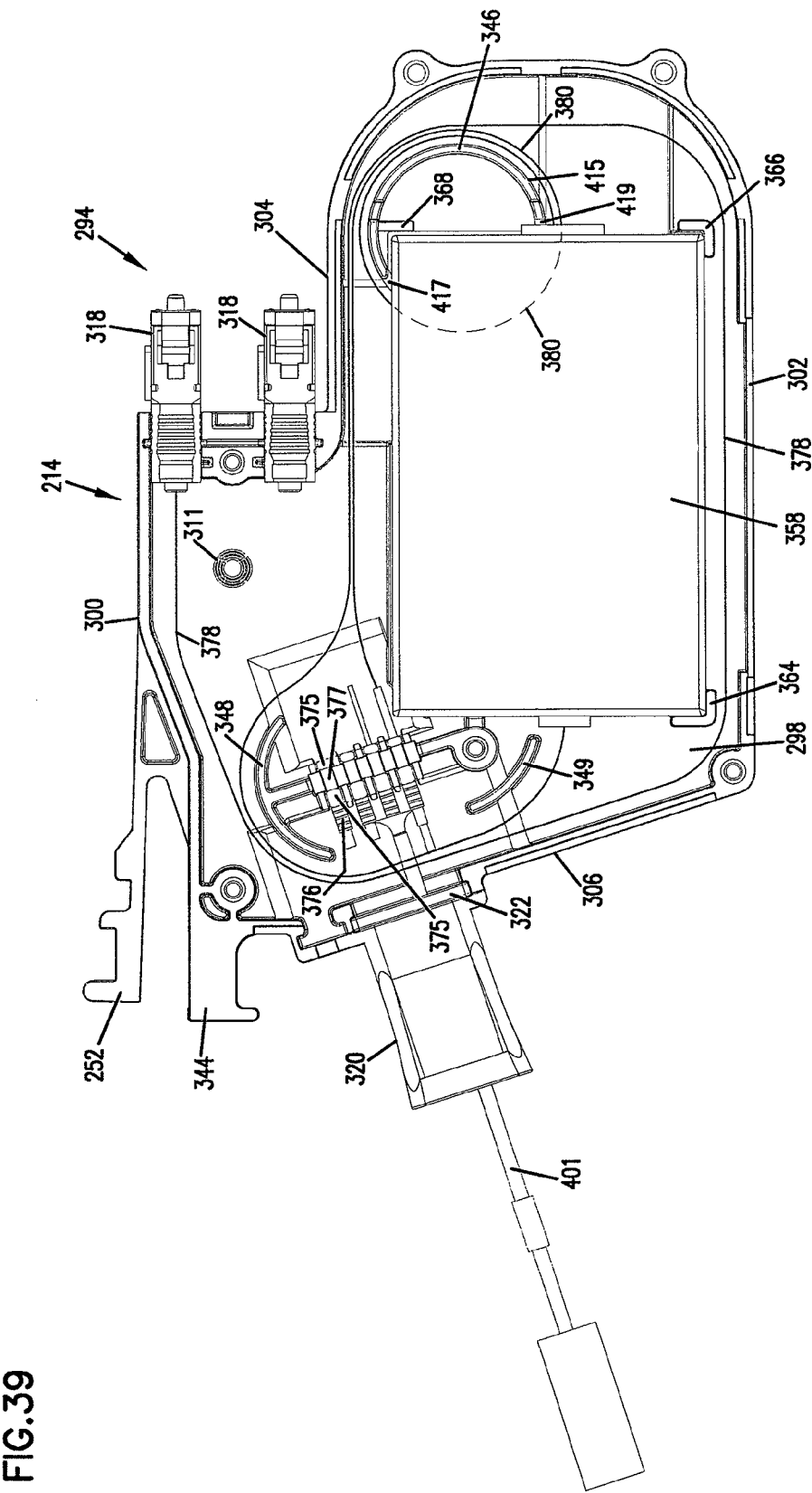
FIG. 39 is a right side view of the WDM module of FIG. 36, shown without a cover exposing the interior features of the module including routing of fiber optic cables within the module.
Figure 40:
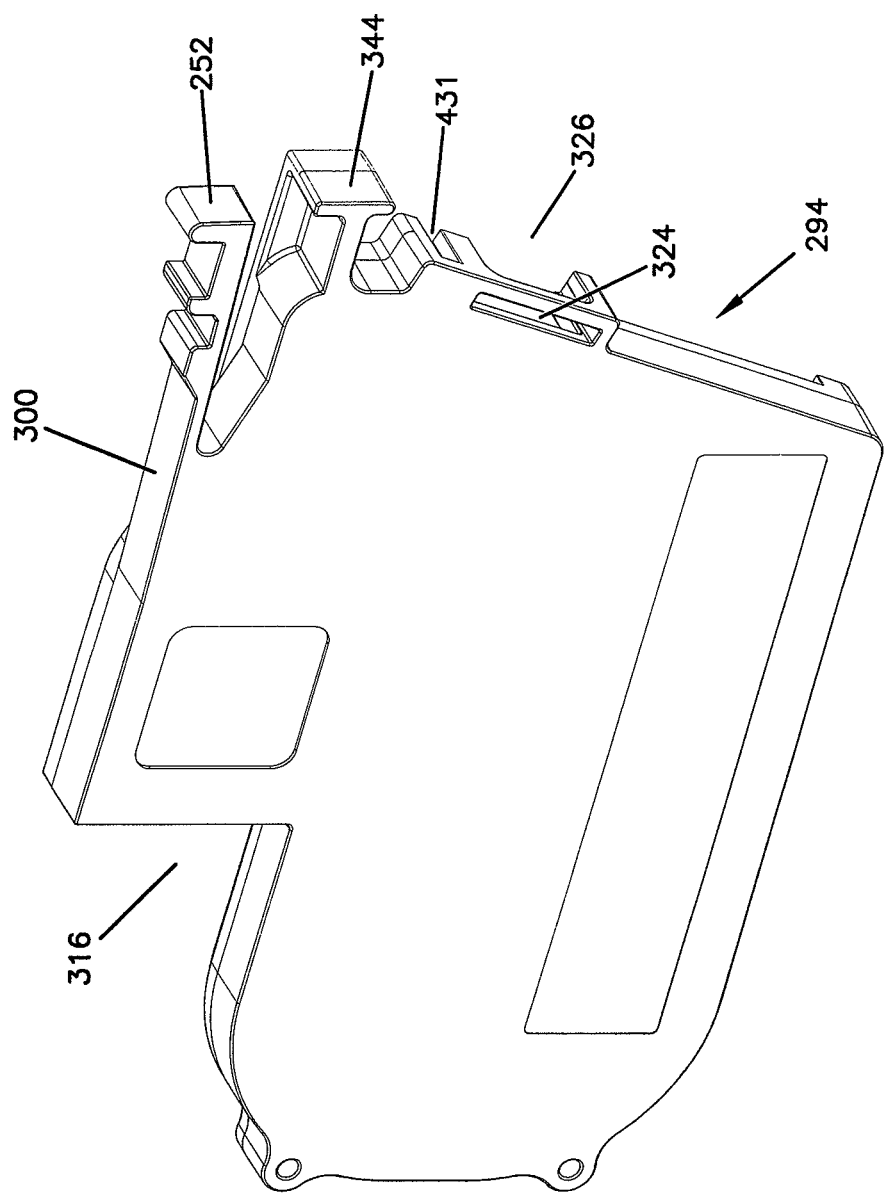
FIG. 40 is a front perspective view of the main housing portion of the WDM module of FIG. 36, the main housing portion shown without the internal components mounted therein.
Figure 41:
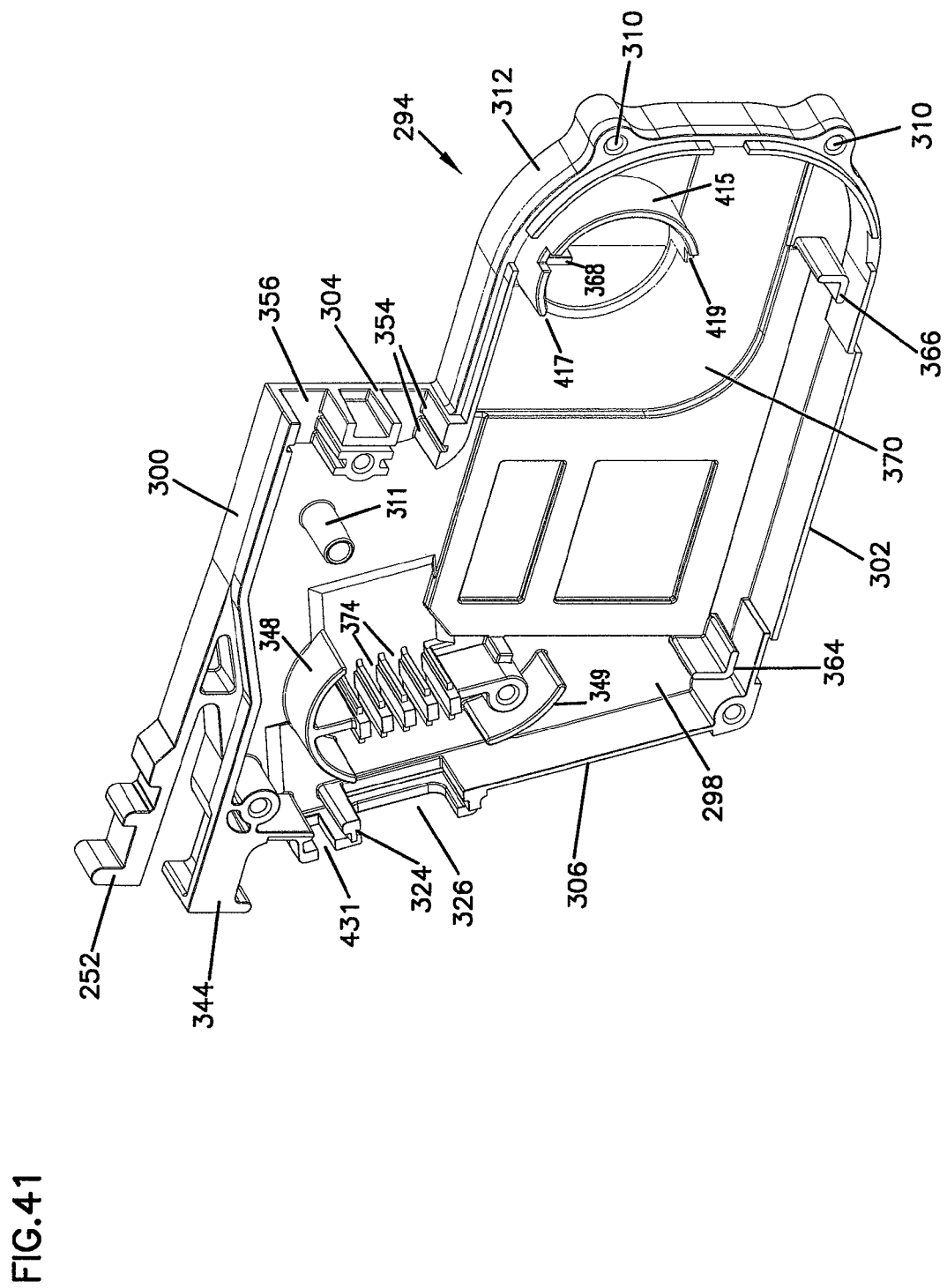
FIG. 41 is a rear perspective view of the main housing portion of FIG. 40.
Figure 42:
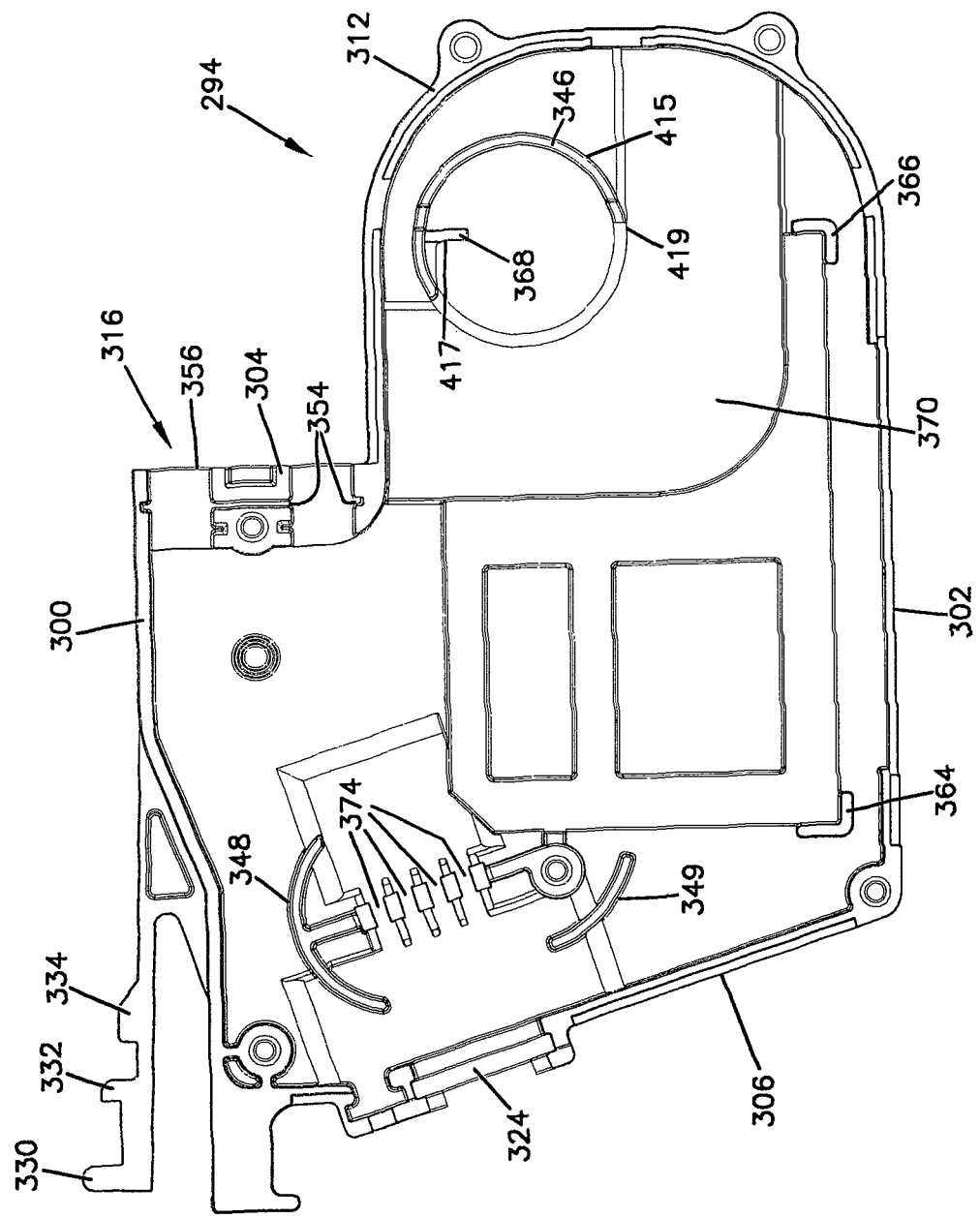
FIG. 42 is a right side view of the main housing portion of FIG. 40.
Figure 44:
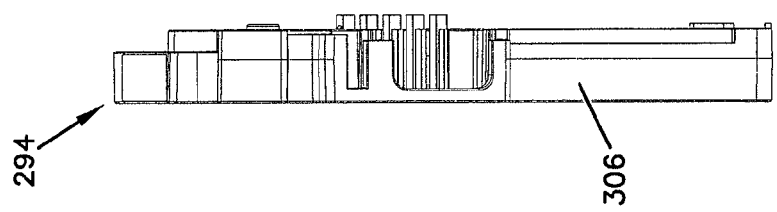
FIG. 44 is a front view of the main housing portion of FIG. 40.
Figure 43:
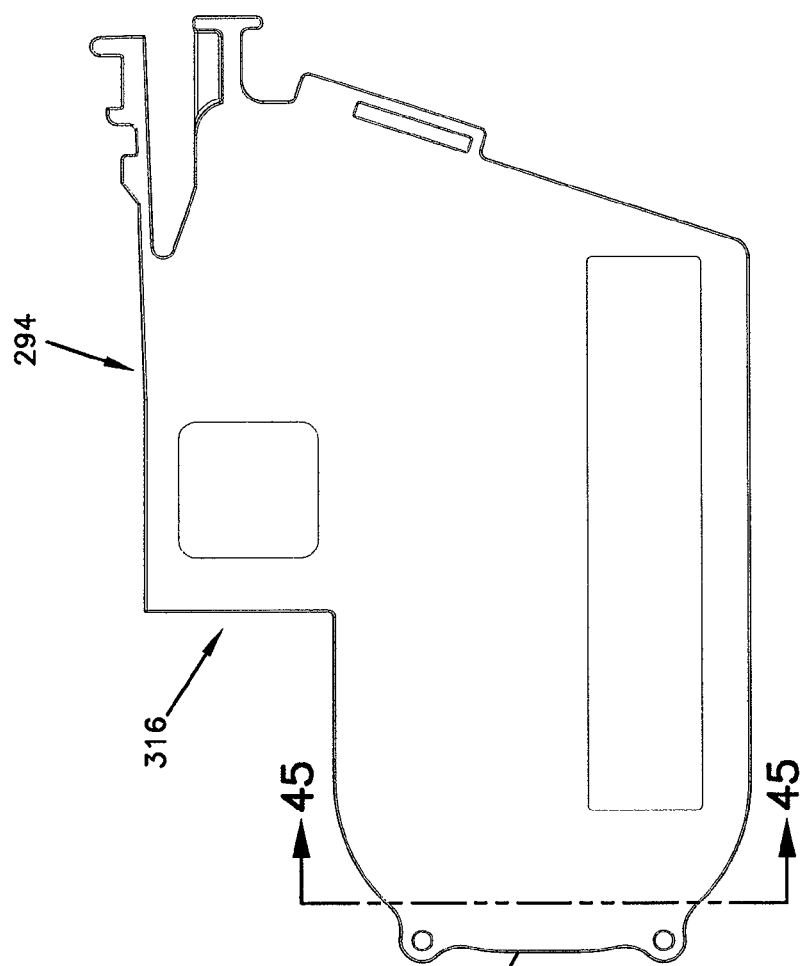
FIG. 43 is a left side view of the main housing portion of FIG. 40.
Figure 45:
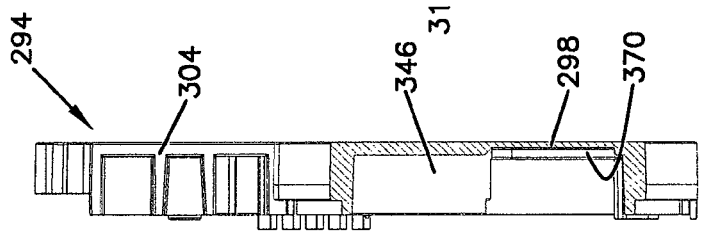
FIG. 45 is a cross-sectional view of the main housing portion of FIG. 40 taken along line 45-45 of FIG. 43.

Adjacent bottom wall 302 of main housing 294 within interior are located a first guide 364 and a second guide 366 for placement of the multiplexer chip 358 within the module 214. A third guide 368 is located adjacent the first radius limiter 346. The first radius limiter 346 defines a curved wall 415. The curved wall 415 includes a first end 417 and a second end 419. The first and second ends 417, 419 of the curved wall 415 also act as guides in positioning the multiplexer chip 358 within the main housing 294. The first, second, and third guides 364, 366, 368 and the ends 417, 419 of the curved wall 415 of the first radius limiter 346 form a frame structure around the chip 358 for correctly positioning the multiplexer chip 358 within the interior of the main housing portion 294. As shown in FIGS. 38 and 39, once the multiplexer chip 358 is placed within the guides, the chip 358 is held within the module 214 against the first sidewall 298 by the removable cover 296.

The first sidewall 298 of the main housing 294 includes a first notch 370 for accommodating fiber cables that may extend underneath the multiplexer chip 358. Once the chip 358 is placed within the main housing 294, the notch 370 creates a space between the chip 358 and the first sidewall 298 and accommodates any cables routed between the chip 358 and the first sidewall 298.

Still referring to FIGS. 40-45, the module main housing 294 also includes integrally formed crimp holders 374 (e.g., slots) adjacent front wall 306 of housing 294 in between the second and third radius limiters 348, 349. Crimp elements 376 (see FIGS. 38-39) crimped to the ends of cables that are multiplexed/demultiplexed by the chip 358 are slidably received into crimp holders 374. Crimp elements 376 define square flanges 375 between which is defined a recessed portion 377. The crimp holders 374 include complementary structure to the crimp elements 376 such that once the crimp elements 376 are slidably inserted into the crimp holders 374, the crimp elements 376 are prevented from moving in a longitudinal direction due to the flanges 375. Once slidably inserted, crimp elements 376 are held in place by the cover 296 that is mounted to module main housing 294. In the embodiment shown, there are four crimp holding slots 374, each one being able to accommodate up to four crimp elements 376. Other numbers are possible. Other complementary shapes between the crimp elements and the crimp holding slots are also possible to provide a slidable fit and to prevent axial movement of the crimp elements once inserted into the crimp holders.

Now referring back to FIGS. 36-39, as in module 14, connectors 318 of WDM module 214 are slidably inserted into opposing slots 354 formed in apertures 356 at the rear wall 304. Connectors 318 project out from rear wall 304 at inset portion 316 of rear wall 304. Connectors 318 of WDM module 214 are similar in construction to connectors 118 of the splitter module 14. Connectors 318 of the WDM module 214 may function both as input connectors and output connectors since the WDM module 214 is configured to both demultiplex signals coming in and multiplex signals going out of the connectors 318. The main housing 294 includes a reinforcement structure 311 extending from the sidewall 298 of the main housing 294. The reinforcement structure 311 aligns and fits into a recess 491 defined on the sidewall 308 of the cover 296 (see FIGS. 46 and 48) when the main housing 294 and cover 296 are assembled together.

Figure 46:
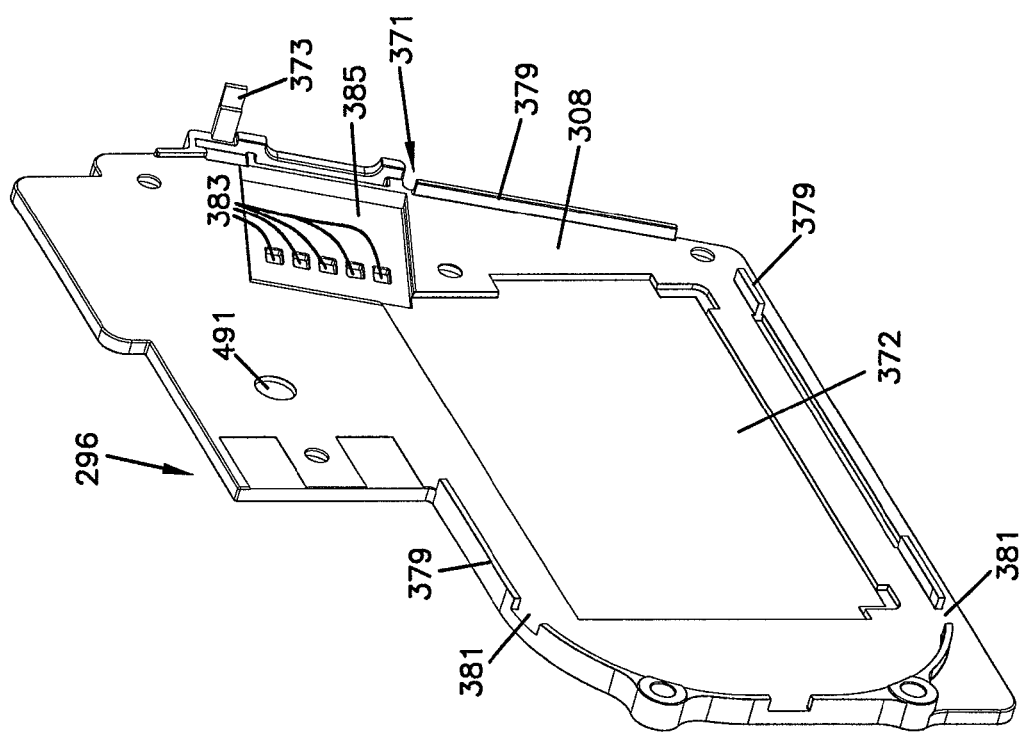
FIG. 46 is a rear perspective view of the cover of the WDM module of FIG. 36.
Figure 47:
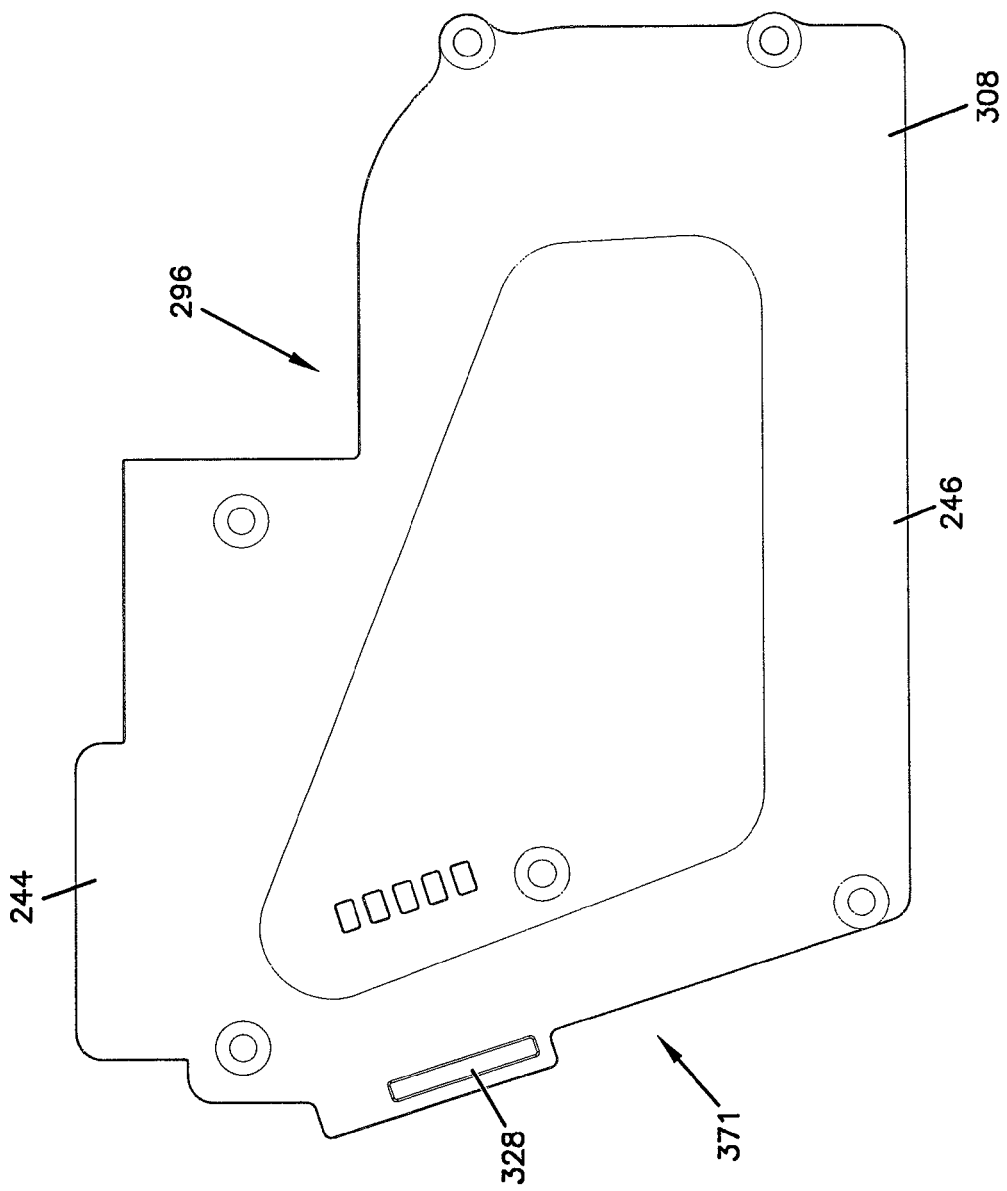
FIG. 47 is a right side view of the cover of FIG. 46.
Figure 48:
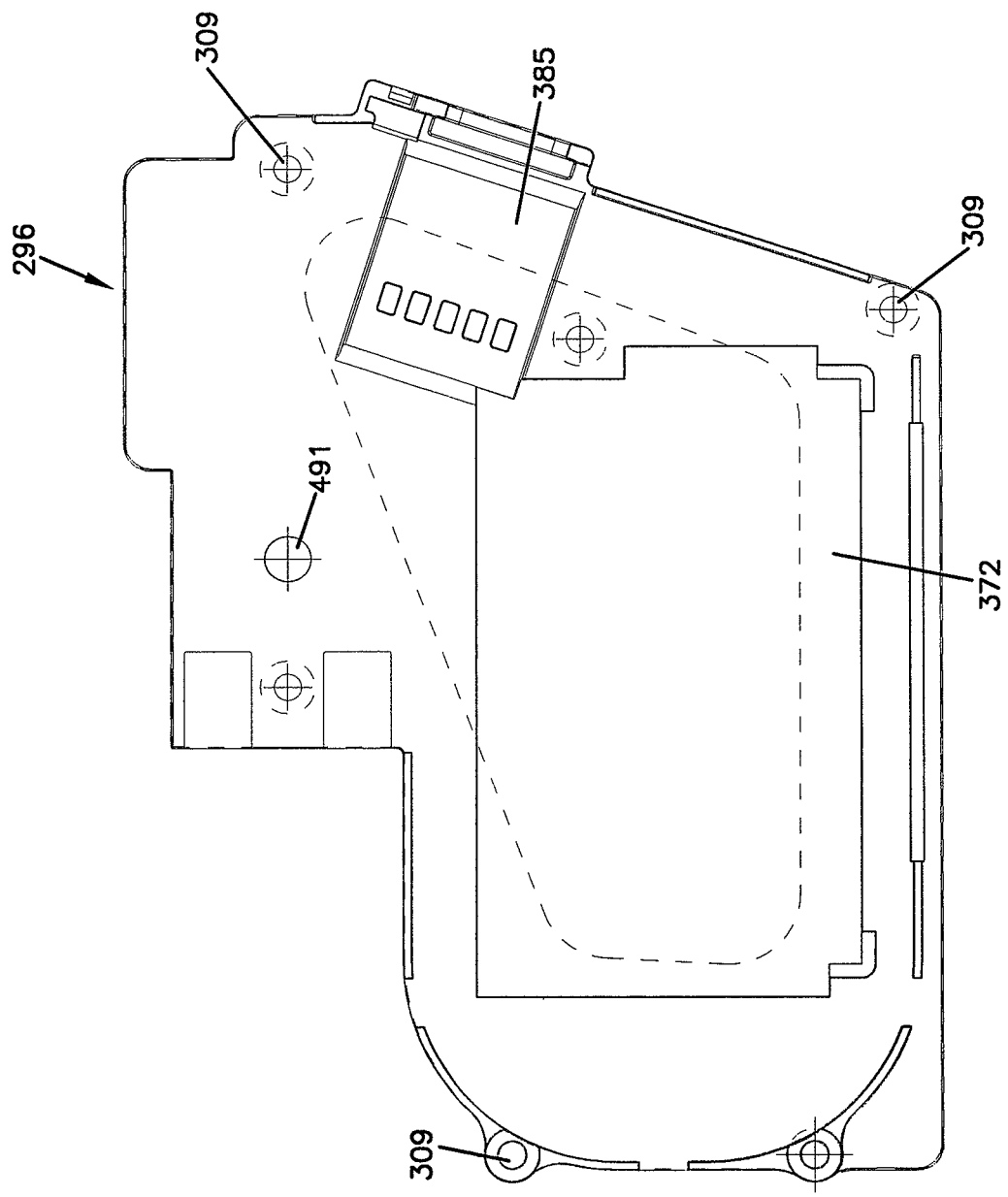
FIG. 48 is a left side view of the cover of FIG. 46.

FIGS. 46-48 illustrate the cover 296 of the WDM module 214. The cover 296 is configured to be fastened to the module main housing portion 294. As discussed previously, once mounted, the cover 296 defines different sized flanges 244, 246 for slidably inserting the module 214 within the chassis 12 and for correctly orienting the module 214 with respect to the chassis 12.

The cover 296 defines a tab 373 adjacent the front end 371 thereof. The tab 373 is slidably inserted within a recess 431 defined at the front wall 306 of the main housing portion 294 (see FIGS. 38 and 41) to correctly orient the cover 296 with respect to the main housing portion 294. As shown in FIG. 46, the cover 296 also includes protruding portions 379 defined around the periphery and slots 381 defined between the protruding portions 379 that intermate with corresponding structures located around the periphery of the main housing 294 for correctly placing the cover 296 onto the main housing 294.

As shown in FIG. 46, the cover 296 defines a second notch 372 on the second sidewall 308. The second notch 372 is configured to accommodate the multiplexer chip 358 once the cover 296 is mounted on the main housing portion 294. The cover 296 also defines slots 383 on the second sidewall 308 for receiving the structures of the main housing portion 294 that define the crimp holders 374 thereinbetween. The slots 383 are located in a notched area 385. This third notch 385 accommodates the area of the main housing portion 294 with the crimp holders 374.

The WDM module 214 is shown in FIG. 39 with the cover 296 and the fiber retainer 360 removed from the main housing portion 294 to illustrate the internal components and to illustrate the cable routing.

One sample cable routing arrangement is shown in FIG. 39. Others are possible. As shown in FIG. 39, a first cable 378 extends from one of the connectors 318 toward and around the second radius limiter 348. From the second radius limiter 348, the first cable 378 extends downwardly toward the third radius limiter 349 and around the first guide 364 toward the rear of the module 214. As the cable 378 extends from the first guide 364, the cable 378 is positioned in a space 400 defined between the bottom wall 302 and the multiplexer chip 358. After going around the second guide 366 and upwardly, the first cable 378 goes around the first radius limiter 346 and toward the front of the module 214. The first cable 378 is, then, led around the second radius limiter 348 and the third radius limiter 349. From the third radius limiter 349, the first cable 378 enters the multiplexer chip 358. The fiber optic signals that are input into the multiplexer 358 are demultiplexed and split into the different wavelengths that are carried by separate second cables 380 for service to different customers.

Once demultiplexed, second cables 380 extend from the chip 358 and are looped around the first radius limiter 346 and then extend underneath the chip 358 before they are looped again around the first radius limiter 346. The first notch 370, as discussed previously, accommodates the cables 380 going underneath the chip 358 between the sidewall 298 of the main housing 294 and the chip 358. After the second cables 380 have been looped around the first radius limiter 346 again, they extend toward crimp holders 374. From crimp holders 374, cables crimped to the other ends of the crimps exit the module through exit as customer output pigtails 401.

As noted above, the routing of the fiber optic cables within module 214 as shown in FIG. 39 is only one example and other ways of routing the cables within the module are possible.

As shown in FIG. 38, a fiber retainer 360 may be placed on the main housing portion 294 to keep cables 380 wrapped around the first radius limiter 346. The fiber retainer 360 is planar and includes a semicircular shape to match the contour of the curved portion 312 of the rear wall 304 of the main housing 294. The fiber retainer 360 includes three tabs 403 positioned around the periphery. The three tabs 403 are placed within slots 405 formed around the curved portion 312 of the rear wall 304. The fiber retainer 360 includes a semi-circular opening 407 which accommodates a portion of the first radius limiter 346 that protrudes through the opening 407. When the fiber retainer 360 is placed on the main housing portion 294, it lies flush with the main housing portion 294 and is held thereagainst by the cover 296.

It will be noted that the multiplexing chip 358 provides a two-way signal path for the signal going through it. Input signals input through the connectors 318 are demultiplexed and are split into different wavelengths and signals coming from the customers are multiplexed and combined into a single signal to be carried on a single fiber that is output also through the connectors 318. For inputting and outputting signals, an outside cable (not shown) terminated by a connector is optically connected to a connector 318 of the module 214 through an adapter 64 of the adapter assembly 16. This connection is established by the slidable insertion of the WDM module 214 into the chassis 12.

According to one embodiment, the WDM module 214 may house a 1×4 dense wavelength division multiplexing chip. According to another embodiment, the WDM module may house a 1×8 dense wavelength division multiplexing chip. According to another embodiment, the WDM module may house a 1×16 dense wavelength division multiplexing chip. In another embodiment, the module may house a coarse wavelength division multiplexing chip. Other types of multiplexer chips are also contemplated.

According to one embodiment, an overlay filter chip may be used within the module 214. Such a chip may be positioned in the space located between the bottom wall 302 of the main housing 294 of the module 214 and the multiplexer chip 358.

The above specification, examples and data provide a complete description of the manufacture and use of the disclosure. Since many embodiments of the disclosure can be made without departing from the spirit and scope of the inventive aspects, the inventive aspects resides in the claims hereinafter appended.

What is claimed is:

1. A telecommunications module comprising:
a housing defining an interior and including a first sidewall, a second sidewall, a top wall, a bottom wall, a rear wall, and a front wall, the rear wall defining a rear face positioned in an inset portion of the rear wall;
a first mounting flange extending beyond the top wall and a second mounting flange extending beyond the bottom wall, one of the first flange and the second flange extending further than the other flange;
at least one fiber optic connector mounted to the rear face and positioned to be inserted into a mating adapter with a rearward movement of the housing, the fiber optic connector including an end projecting rearwardly from the rear face;
a cable exit positioned on the front wall of the housing, the cable exit including an outer extension beyond the front wall;
a first fiber optic cable within the interior of the housing extending from the at least one fiber optic connector of the rear face to an optical wavelength division multiplexer/demultiplexer mounted within the interior of the housing;
a plurality of second fiber optic cables within the housing extending from the optical wavelength division multiplexer/demultiplexer to the cable exit in the front wall.

2. A telecommunications assembly comprising:
a chassis and a module mounted within the chassis;
the chassis including:
a housing with a top, a bottom, and opposing sides, defining an interior space accessible through an open front, the housing including a back opposite the open front;
a plurality of mounting locations within the interior space;
at least one fiber optic adapter corresponding to each of the mounting locations mounted within the interior space, the fiber optic adapters each including a front end directed toward the open front and a back end directed toward the back, each front end and each back end configured to receive a fiber optic connector; and,
the fiber optic adapters mounted to an adapter assembly mounted to the chassis, the adapter assembly removable from the interior space of the chassis; and,
the module mounted at one of the mounting locations and including:
a housing defining an interior and a rear face to which is mounted at least one fiber optic connector engaging the at least one fiber optic adapter of the chassis, wherein the at least one fiber optic connector projects rearwardly from the rear face, the housing also defining a cable exit; and
an optical wavelength division multiplexer/demultiplexer mounted within the interior of the housing, a first fiber optic cable within the interior of the housing extending from the at least one fiber optic connector to the optical wavelength division multiplexer/demultiplexer mounted within the interior of the housing and a second fiber optic cable extending from the optical wavelength division multiplexer/demultiplexer to an outside of the housing through the cable exit;
wherein the module is mounted within the chassis housing separately from the removable fiber optic adapter assembly such that the at least one fiber optic connector of the module engages the at least one fiber optic adapter mounted to the chassis when the module is mounted within the chassis housing.

3. A telecommunications assembly according to claim 2, wherein the back of the chassis defines a rear opening, wherein the module is configured to be slidably received into the chassis and slidably removed from the chassis through the open front and the adapter assembly configured to be slidably received into the chassis and slidably removed from the chassis through the rear opening.

4. A telecommunications assembly according to claim 2, wherein the chassis includes a flexible shield for blocking light off a front end of an adapter of the adapter assembly, the shield movable between an operating position and a non-operating position, the shield configured to be moved from the operating position to the non-operating position by the module when the module is slidably inserted within the chassis.

5. A telecommunications assembly according to claim 2, wherein each mounting location includes a front catch and the module includes a flexible latch, the front catch and the flexible latch forming a snap fit connection for retaining the module within the chassis.

6. A method of using a telecommunications chassis comprising a top, a bottom, a front opening, a rear opening, and first and second transverse sides extending between the front and rear openings, the chassis defining a plurality of mounting locations, the method comprising:

slidably inserting an adapter assembly defining at least one fiber optic adapter into the chassis at one of the mounting locations; and slidably inserting a separate module including an optical wavelength division multiplexer/demultiplexer within the module and at least one fiber optic connector protruding from the module into the chassis at one of the mounting locations to insert the fiber optic connector of the module into an adapter of the adapter assembly, wherein the at least one fiber optic connector of the module is optically coupled to the optical wavelength division multiplexer/demultiplexer within the module.

7. A method according to claim 6, further comprising providing each mounting location with a pair of opposing slots and the module with a pair flanges, one of the flanges being larger than the other and only one of the slots sized to receive the larger flange, the method further comprising aligning the larger flange of the module with the slot of the mounting location sized to receive the larger flange prior to inserting the module within the chassis.

8. A method according to claim 6, further comprising sliding the adapter assembly into the chassis through the rear opening and sliding the module into the chassis through the front opening.

9. A telecommunications module, comprising:

a housing including a main housing portion defining a first transverse wall, a front wall, a rear wall, a top wall, and a bottom wall, cooperatively defining an interior;

the main housing including a fiber optic signal input location;

the main housing also including a cable exit extending from the front wall of the module toward the outside of the module;

the module including an optical device located within the interior;

the module including a first cable management structure located within the interior of the module for guiding cables extending between the fiber optic signal input location and the optical device;

the module including a second cable management structure located within the interior of the module for guiding cables extending between the optical device and the cable exit;

at least one of the first and second cable management structures defining a curved wall;

a removably mounted fiber retainer for keeping cables around at least one of the first and second cable management structures, the fiber retainer defining a generally planar configuration with an opening having at least one generally curved side, at least a portion of the curved wall of the at least one of the first and second cable management structures protruding at least partially through the opening; and the housing of the module including a cover portion for mounting to the main housing portion for closing off the interior of the main housing portion.

10. A telecommunications module according to claim 9, wherein the fiber retainer also defines an exterior curved side.

11. A telecommunications module according to claim 9, wherein the fiber retainer defines at least one tab placed within a slot formed on one of the top wall, bottom wall, or rear wall.

12. A telecommunications module according to claim 11, wherein the fiber retainer defines at least three tabs, one placed within a slot formed on the top wall, one placed within a slot formed on the bottom wall, and one placed within a slot formed on the rear wall.

13. A telecommunications module according to claim 11, wherein the fiber retainer is configured to lie flush against the main housing portion of the module so as to be held thereagainst by the cover portion.

14. A telecommunications module according to claim 9, wherein the fiber optic signal input location is defined by a fiber optic connector protruding outwardly from the rear wall of the housing.

15. A telecommunications module according to claim 9, wherein the optical device is an optical wavelength division multiplexer/demultiplexer.

* * * * *

UNITED STATES PATENT AND TRADEMARK OFFICE
CERTIFICATE OF CORRECTION

| | |
|---|---|
| PATENT NO. | : 8,542,972 B2 |
| APPLICATION NO. | : 13/049176 |
| DATED | : September 24, 2013 |
| INVENTOR(S) | : Zimmel |

Page 1 of 1

It is certified that error appears in the above-identified patent and that said Letters Patent is hereby corrected as shown below:

In the Claims

Col. 17, line 15, claim 7: "with a pair flanges," should read --with a pair of flanges,--

Signed and Sealed this
Fourteenth Day of October, 2014

Michelle K. Lee
*Deputy Director of the United States Patent and Trademark Office*